(12) United States Patent
Peterson

(10) Patent No.: US 7,887,202 B1
(45) Date of Patent: Feb. 15, 2011

(54) VEHICULAR MIRROR SYSTEM WITH DUAL DETENT POWERFOLD ASSEMBLY

(75) Inventor: Kenneth C. Peterson, Comstock Park, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 177 days.

(21) Appl. No.: 12/142,971

(22) Filed: Jun. 20, 2008

Related U.S. Application Data

(60) Provisional application No. 60/945,672, filed on Jun. 22, 2007.

(51) Int. Cl.
*G02B 5/08* (2006.01)
*G02B 7/182* (2006.01)
(52) U.S. Cl. ...................................... 359/841; 359/877
(58) Field of Classification Search .................. 359/841
See application file for complete search history.

(56) References Cited

U.S. PATENT DOCUMENTS

| | | | |
|---|---|---|---|
| 6,439,730 B1 | 8/2002 | Foote et al. | |
| 6,598,983 B1 | 7/2003 | Boddy | |
| 7,207,683 B2 | 4/2007 | Lewis | |
| 7,303,294 B1 | 12/2007 | Ruse et al. | |
| 2007/0035862 A1* | 2/2007 | Brouwer et al. | 359/841 |

* cited by examiner

*Primary Examiner*—Arnel C Lavarias
*Assistant Examiner*—Jade R Chwasz
(74) *Attorney, Agent, or Firm*—McGarry Bair PC

(57) ABSTRACT

A mirror assembly includes a reflective element assembly providing a reflective view, a base mounted to a motor vehicle, a support arm assembly having a first end attached to the base for movement between a folded configuration and an unfolded configuration, and a second end mounted to the reflective element assembly, a detent assembly interposed between the first end of the support arm assembly and the base, and a pivot assembly associated with the detent assembly and adapted for manual and motorized movement of the support arm assembly between the folded configuration and the unfolded configuration. The detent assembly includes an actuator plate and a detent plate, the actuator plate having a first series of detent structures and the detent plate having a second series of detent structures complementary to the first series of detent structures for nested engagement of the actuator plate and the detent plate.

13 Claims, 23 Drawing Sheets

US 7,887,202 B1

VEHICULAR MIRROR SYSTEM WITH DUAL DETENT POWERFOLD ASSEMBLY

CROSS-REFERENCE TO RELATED APPLICATION

This application claims the benefit of U.S. provisional application Ser. No. 60/945,672, filed Jun. 22, 2007, which is incorporated herein in its entirety.

BACKGROUND OF THE INVENTION

1. Field of the Invention

The invention relates generally to vehicular rearview mirror assemblies and in particular to a pivot connection for a powerfold mirror system.

2. Description of the Related Art

Externally mounted rearview mirror systems are ubiquitous for motorized vehicles. Conventional rearview mirror systems frequently incorporate a motorized pivot assembly which enables the reflective element portion of the mirror system to be selectively folded against the vehicle and unfolded to a use position, and which is often referred to as a powerfold assembly. Such powerfold assemblies may also enable manual folding and unfolding of the mirror system. However, manual operation of a powerfold mirror system presents technical issues which must be overcome. In particular, powerfold assemblies frequently incorporate an electric motor, a transmission assembly, a clutch mechanism, detent assemblies, biasing elements, and the like, which ensure smooth operation and positioning of the reflective element portion, minimization of vibration, and precise control of folding and unfolding.

After assembly of the rearview mirror system to the vehicle, it is customary to fold the reflective element assembly against the vehicle by actuating the powerfold feature. The motorized movement of the reflective element assembly is performed with the pivot assembly components in a selected configuration, referred to as the "home" position. Positioning the mirror system in a folded position protects the mirror system from potential damage during the transportation of the vehicle to the sales destination, such as an automobile dealership. Upon arrival at the dealership, the reflective element assembly is customarily manually unfolded to the use position. With prior art mirrors, the mirror cannot be positioned accurately and rigidly in the use position due to the relative juxtaposition or misalignment of pivot assembly components, such as detent assemblies, in the manually unfolded configuration. Thus, with the mirror system effectively inoperable, a vehicle owner will frequently return the vehicle to the dealership for service to correct the misalignment, which is aggravating, time consuming, and costly.

There is a need for a powerfold mirror system that can be manually folded or unfolded without adversely affecting a subsequent powerfold actuation.

SUMMARY OF THE INVENTION

A mirror assembly includes a reflective element assembly providing a reflective view, a base mounted to a motor vehicle, a support arm assembly having a first end attached to the base for movement between a folded configuration and an unfolded configuration, and a second end mounted to the reflective element assembly, a detent assembly interposed between the first end of the support arm assembly and the base, and a pivot assembly associated with the detent assembly and adapted for manual and motorized movement of the support arm assembly between the folded configuration and the unfolded configuration. The detent assembly includes an actuator plate and a detent plate, the actuator plate having a first series of detent structures and the detent plate having a second series of detent structures complementary to the first series of detent structures for nested engagement of the actuator plate and the detent plate.

DESCRIPTION OF AN EMBODIMENT OF THE INVENTION

Figure 1:
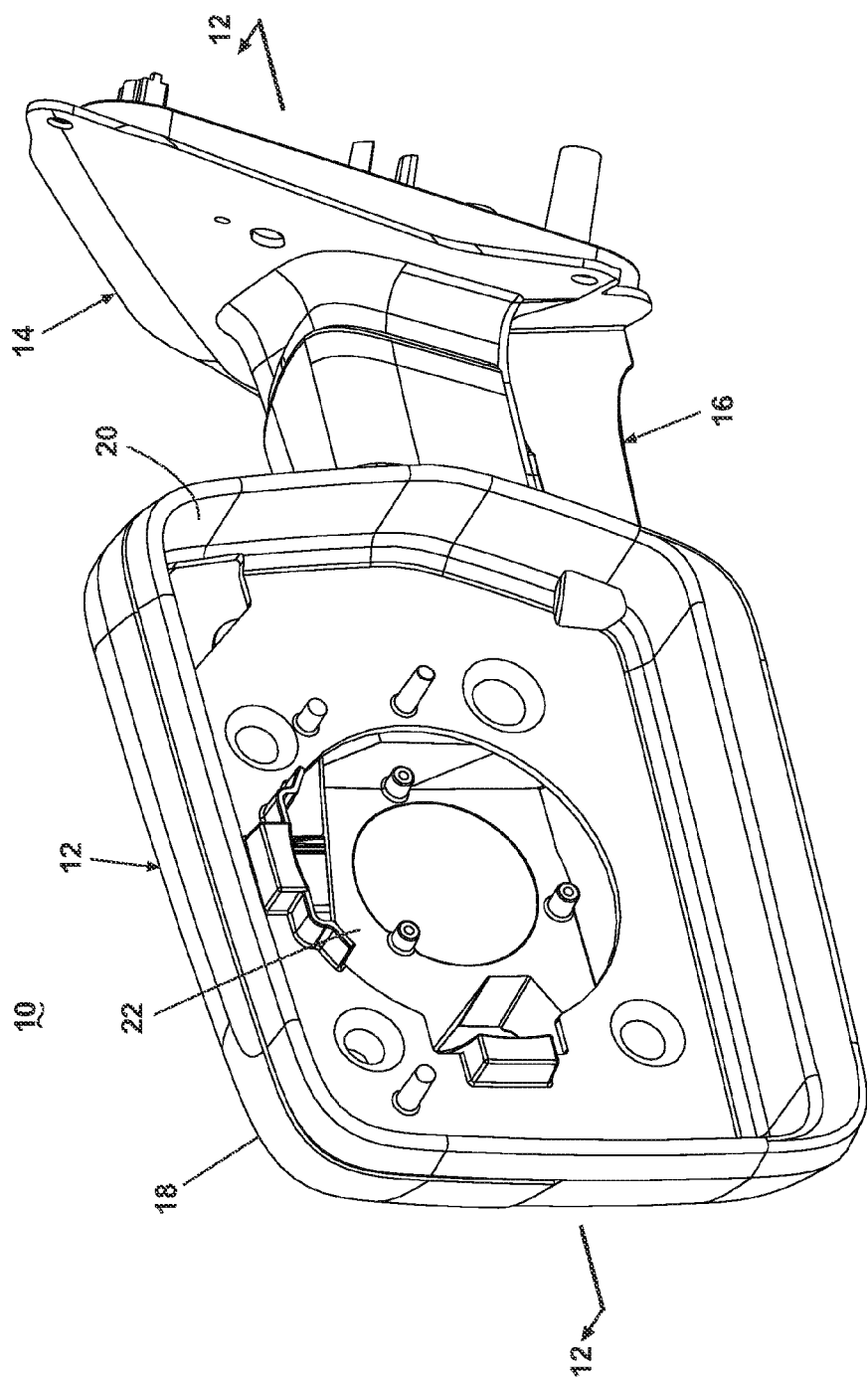
FIG. 1 is a perspective view of an embodiment of the invention comprising a vehicular rearview mirror system having a base assembly, a pivot connection, and a dual detent powerfold assembly, with a reflective element assembly removed for clarity.

Referring now to the Figures, and to FIG. 1 in particular, an embodiment of the invention comprises a vehicular rearview mirror system 10 having a reflective element assembly 12 coupled through a pivot assembly 16 to a base assembly 14 attached to the side of a motor vehicle (not shown). The mirror system 10 comprises many of the structural and operational elements and functions of a vehicular rearview mirror system described and illustrated in U.S. patent application Ser. No. 11/162,556, filed Sep. 14, 2005, entitled "A Vehicle Mirror System With Reduced Friction Actuation And Movement," now U.S. Pat. No. 7,303,294, issued Dec. 4, 2007, which is incorporated as though set forth fully herein.

Figure 2:
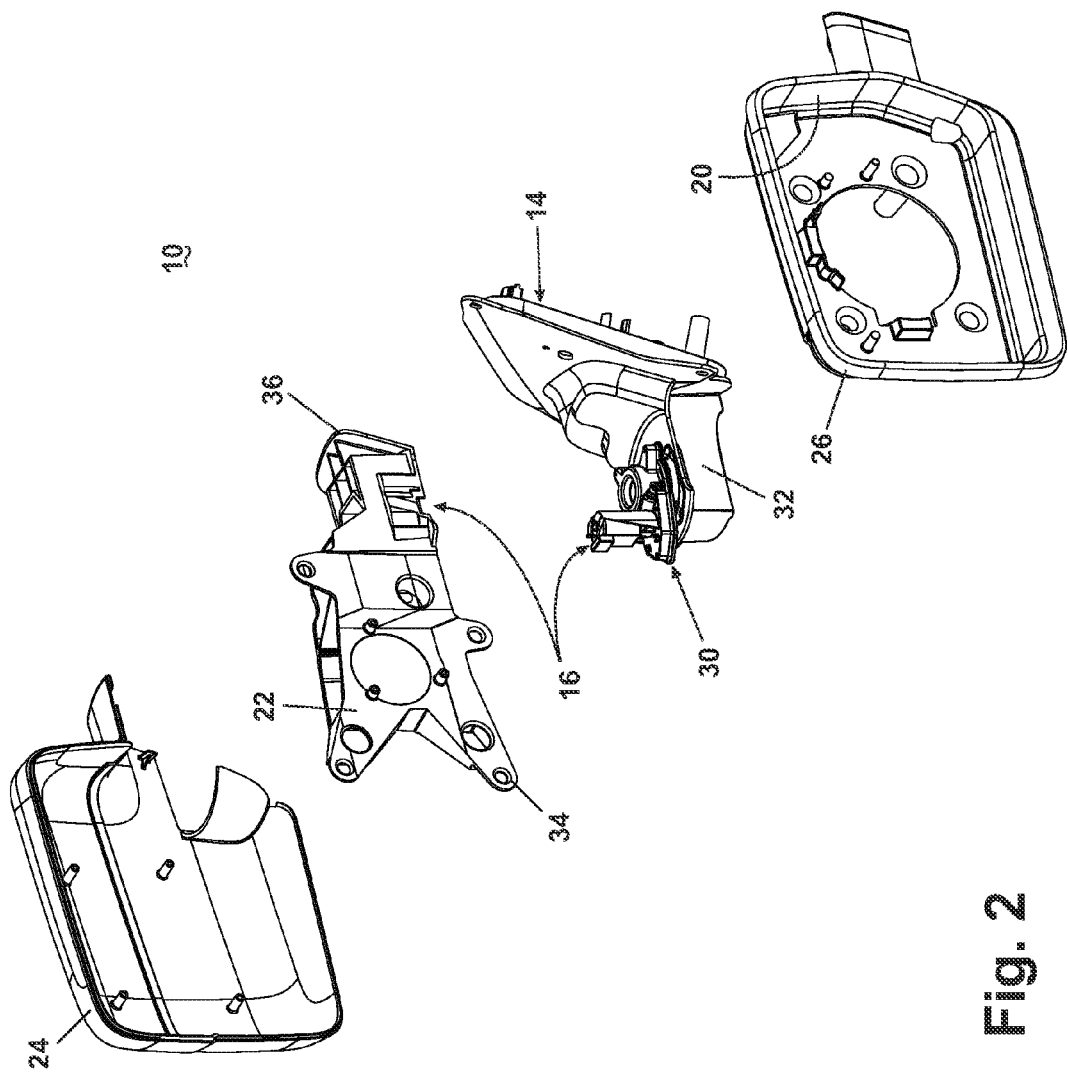
FIG. 2 is an exploded view of the rearview mirror system illustrated in FIG. 1 showing the powerfold assembly mounted to the base assembly.

The reflective element assembly 12 comprises a housing assembly 18 comprises a front housing element 24 and a rear housing element 22 having an opening 20 for enclosing a reflective element and a tilt actuator (neither shown) for providing an occupant of the vehicle with an adjustable rearward view. Referring also to FIG. 2, a support frame 22 is an irregularly-shaped member having a configuration and dimensions suitable for attachment of the tilt actuator and reflective element thereto, and the pivotable coupling of the reflective element assembly 12 to the base assembly 14 for pivoting of the support frame 22 and reflective element assembly 12 about a generally vertical axis relative to the base assembly 14, as hereinafter described. The support frame 22 has a distal end 34 adapted for attachment of the tilt actuator, and a proximal end 36 adapted with a receptacle, mounting brackets, and the like for registry with a pivot assembly 30 attached to the base assembly 14. Alternatively, the support frame 22 can be adapted to incorporate the pivot assembly integrally into the proximal end 36. The support frame 22 is enclosed within the housing assembly 18 so that the reflective element can be viewed through the opening 20.

The base assembly 14 is adapted for attachment to the vehicle and comprises a cantilever arm 32 forming an outwardly-directed portion of the base assembly 14 adapted for attachment of the pivot assembly 30 thereto.

Figure 3:
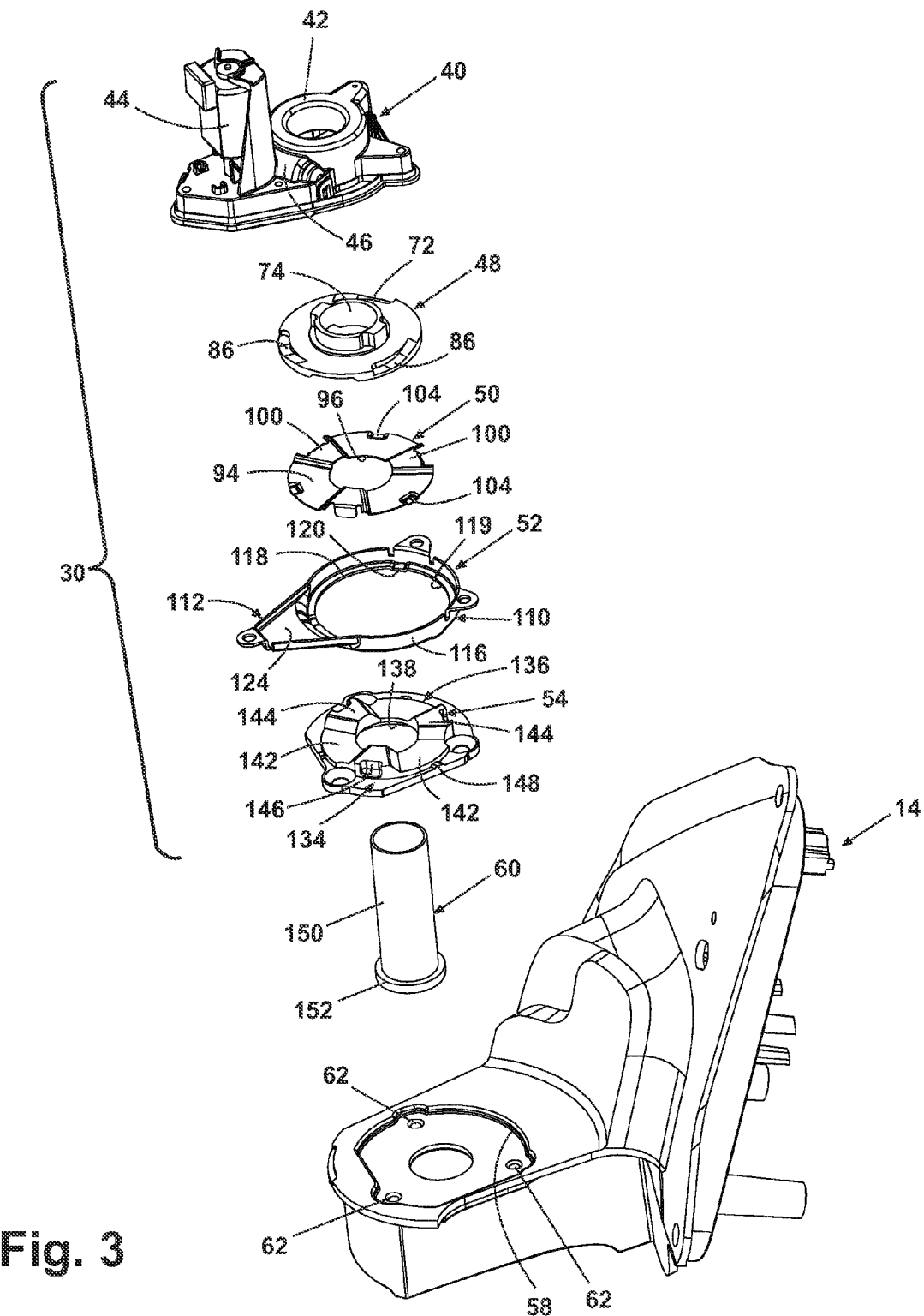
FIG. 3 is an exploded view of the powerfold assembly and base assembly illustrated in FIG. 2, showing an upper housing, an upper actuator plate, a detent plate, a lower housing element, a lower pivot plate, and a pivot post.

Referring now to FIG. 3, the pivot assembly 30 comprises a pivot drive assembly 40 comprising an upper housing 42 adapted for supporting a drive motor 44, a drive motor 44, and a transmission assembly 46. The drive motor 44 is preferably electrically powered through the vehicle electrical system, and controlled by a suitable switching device which may incorporate digital microprocessor-based logic devices. The transmission assembly 46 is adapted to convert the rotation of the drive motor shaft (not shown) to controlled rotation of the support frame 22 about a parallel axis of rotation. The pivot assembly 30 also comprises an upper actuator plate 48, a detent plate 50, a lower housing element 52, and a lower pivot plate 54 in a stacked configuration, as hereinafter described.

Figure 4:
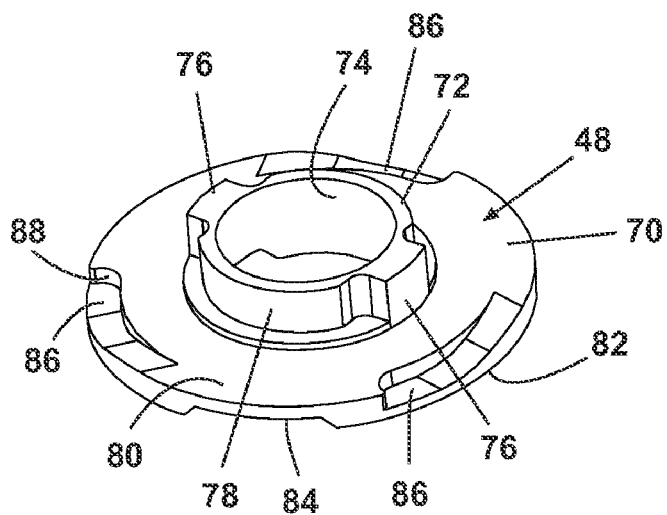
FIG. 4 is a perspective view from above of the upper actuator plate illustrated in FIG. 3.
Figure 5:
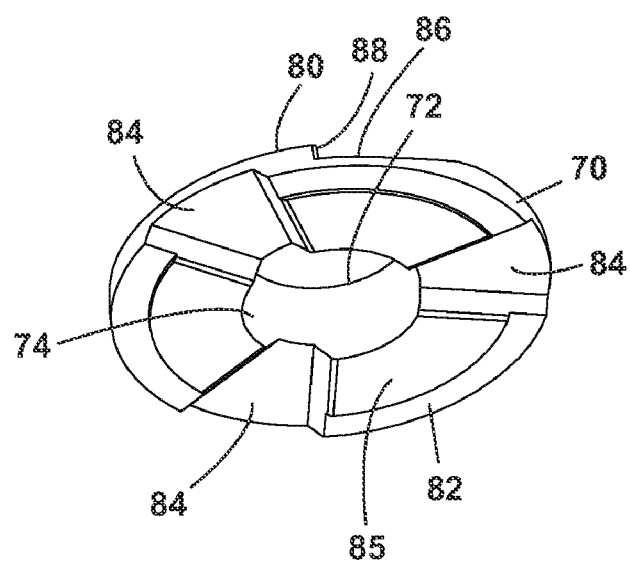
FIG. 5 is a perspective view from below of the upper actuator plate illustrated in FIG. 4.

Referring now to FIGS. 4 and 5, the upper actuator plate 48 is a generally circular disc-like structure comprising a planar outer flange 70 having an obverse side 80 and a reverse side 82. The flange 70 circumscribes an annular collar 72 extending orthogonally away from the obverse side 80. The collar 72 defines an opening 74 extending axially through the upper actuator plate 48, and widens in a pair of generally rectilinear, diametrically-opposed lugs 76. The collar 72 defines an outer surface 78 extending between the lugs 76. A plurality of upper inclined channelways 86 having a generally arcuate configuration extends along the perimeter of the flange 70 in regularly-spaced disposition. 3 channelways 86 are illustrated in FIG. 4, spaced at 120°, although a greater or fewer number can be employed. The channelways 86 incline downwardly from the obverse side 80 into the flange 70 to terminate in a vertical, arcuate end wall 88.

Referring specifically to FIG. 5, the reverse side 82 of the upper actuator plate 48 comprises a series of regularly-spaced radially-disposed lower recesses 84 extending from the reverse side 82 into the flange 70. 3 lower recesses 84 generally having the shape of a truncated triangle are illustrated, spaced at 120°, although a greater or fewer number can be employed.

As disclosed in U.S. Pat. No. 7,303,294, the collar 72 and lugs 76 are adapted for slidable registry with a ring gear (not shown) to form a geared assembly adapted for rotation of the upper actuator plate 48 by the actuation of the transmission assembly 46.

Figure 6:
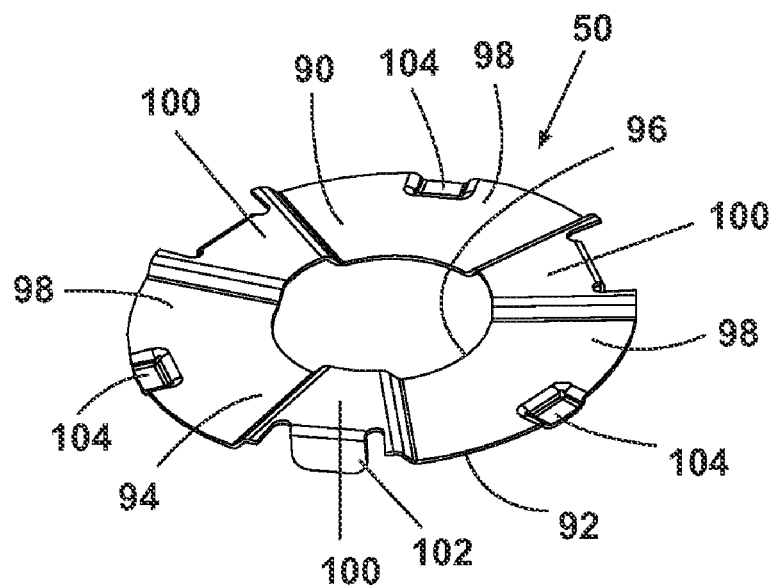
FIG. 6 is a perspective view from above of the detent plate illustrated in FIG. 3.
Figure 7:
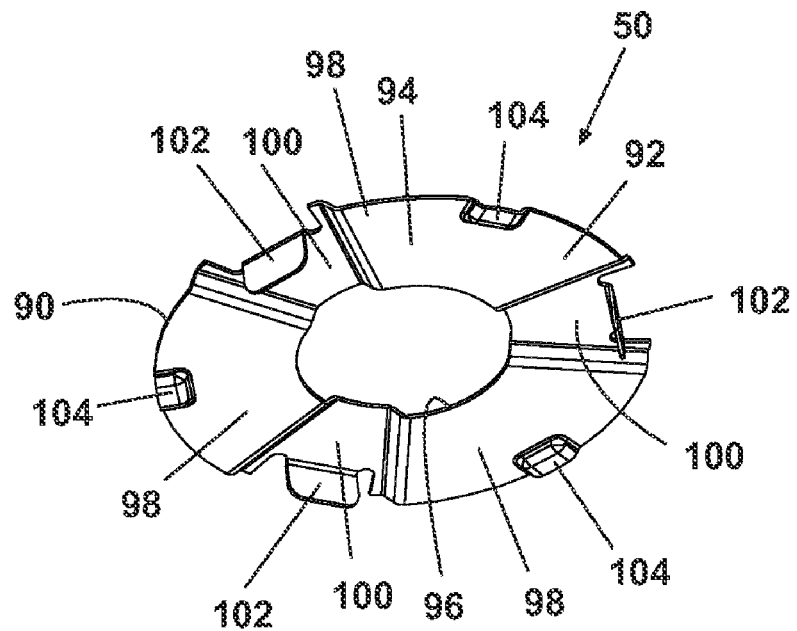
FIG. 7 is a perspective view from below of the detent plate illustrated in FIG. 6.

Referring now to FIGS. 6 and 7, the detent plate 50 is a thin, generally circular disc-like body comprising a flange portion 90 having a reverse side 92 and an obverse side 94. An opening 96 extends coaxially therethrough, having a diameter that is generally equal to the diameter of the opening 74 in the upper actuator plate 48. The flange portion 90 is adapted with a series of arcuate sector portions 98 separated by a series of detent portions 100 having the shape generally of a truncated triangle, and adapted for nested engagement with the lower recesses 84 of the upper actuator plate 48. As illustrated in FIGS. 6 and 7, 3 detent portions 100 are adapted to correspond with the number of lower recesses 84 in the upper actuator plate 48.

The detent portions 100 terminate radially outwardly in a depending, plate-like finger 102 generally orthogonal to the plane of the detent plate 50. The detent portions 100 are truncated at the fingers 102 so that the sector portions 98 extend radially outwardly beyond the fingers 102. The sector portions 98 are provided with a somewhat rectilinear detent 104 depending from the obverse side 94. The detents 104 are located along the radial centerline of the sector portions 98, adjoining the circumferential edge of the sector portions 98.

Figure 8:
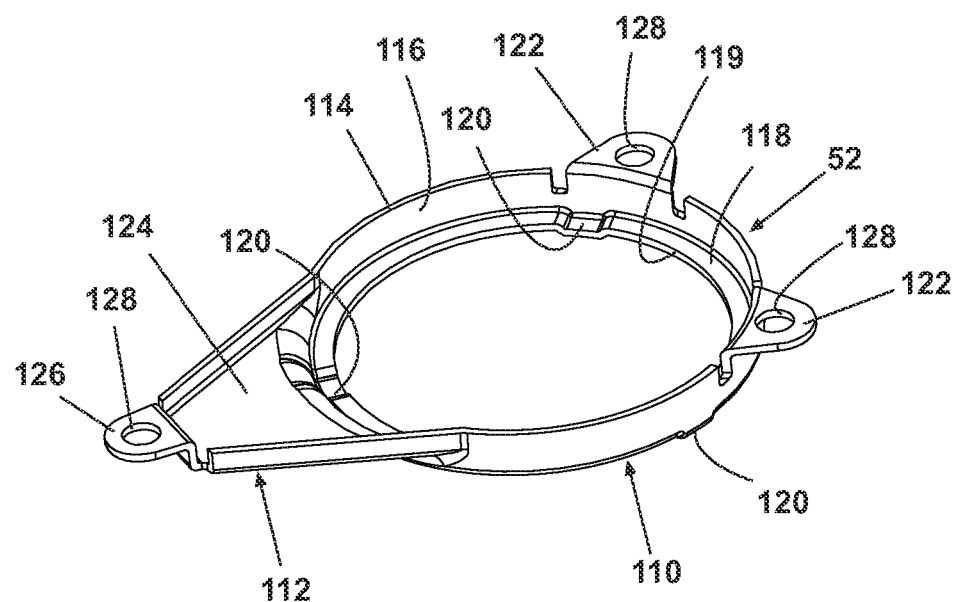
FIG. 8 is a perspective view from above of the lower housing element illustrated in FIG. 3.
Figure 9:
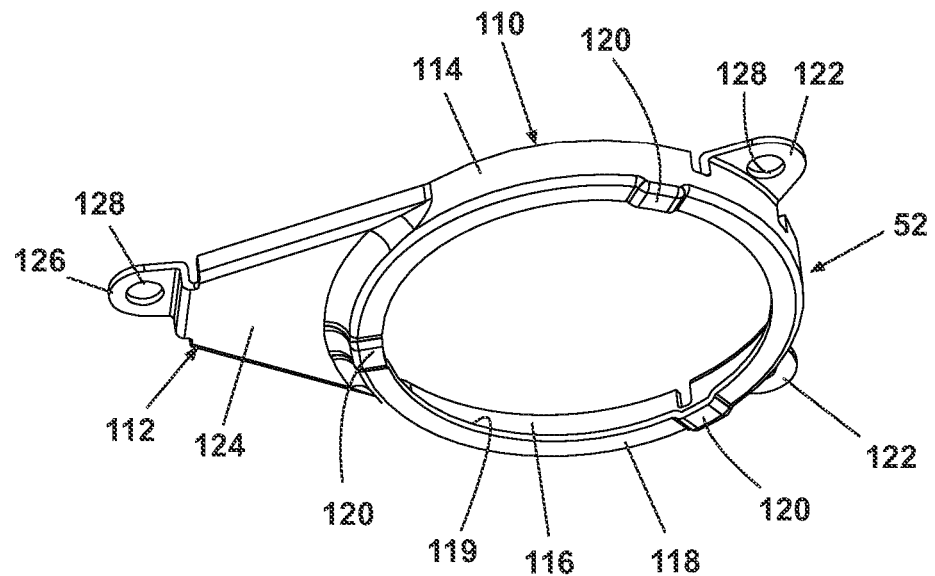
FIG. 9 is a perspective view from below of the lower housing element illustrated in FIG. 8.

Referring now to FIGS. 8 and 9, the lower housing element 52 is a generally ring-like body comprising an annular portion 110 and an arm portion 112 extending radially away from the ring portion 110. The annular portion 110 comprises a circumferential wall 114 having an inner surface 116 and transitioning radially inwardly to an annular flange 118 defining a circular opening 119. A series of detent portions 120 depends from the annular flange 118 in regularly-spaced disposition therealong, for example, 120° as illustrated in FIGS. 8 and 9. The detent portions 120 are adapted for nested engagement with the detents 104. Extending radially away from an upper portion of the circumferential wall 114 is a pair of mounting ears 122 having apertures 128 therethrough adapted for receipt of a suitable fastener, such as a screw or a bolt, for removably fastening the lower housing element 52 to the underside of the upper housing 42.

The arm portion 112 comprises a somewhat triangular plate-like member 124 generally parallel with the annular flange 118 and terminating at its vertex in a mounting ear 126 having an aperture 128 therethrough for receipt of a suitable fastener, such as a screw or a bolt. The arm portion 112 extends from the circumferential wall 114 radially outwardly in generally diametric disposition relative to the mounting ears 122. The mounting ear 126 is adapted for attaching the arm portion 112 to the underside of the upper housing 42.

The diameter of the circumferential wall 114 is somewhat greater than the diameter of the detent plate 50 so that the detent plate 50 can be received within the circumferential wall 114. The detent portions 120 are adapted for engagement with the detents 104 of the detent plate 50.

Figure 10:
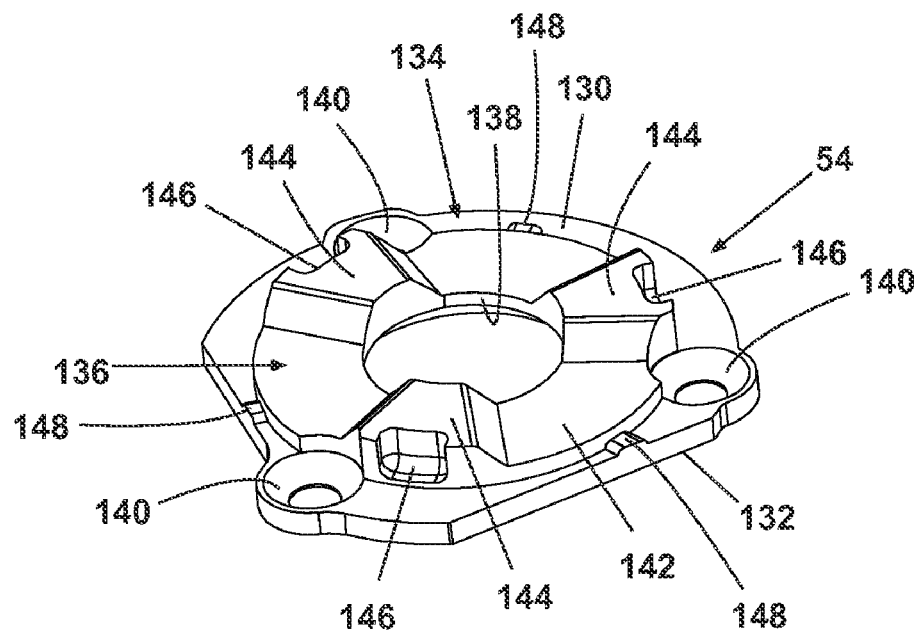
FIG. 10 is a perspective view from above of the lower pivot plate illustrated in FIG. 3.
Figure 11:
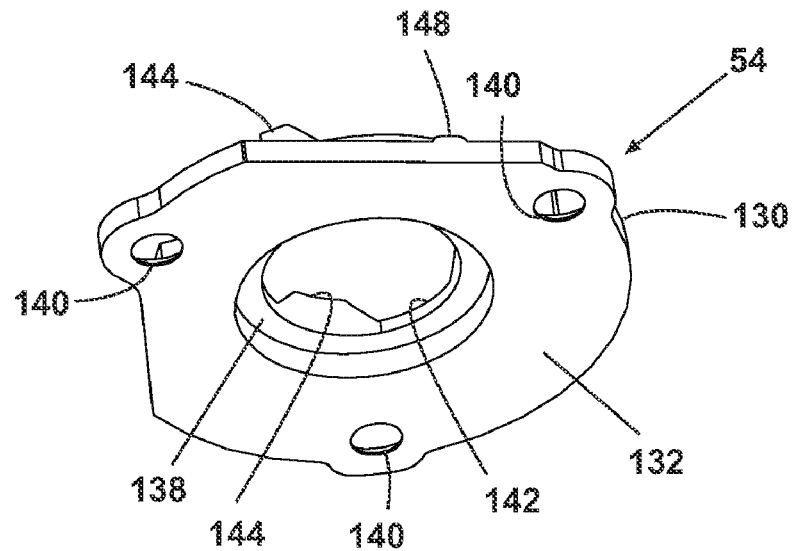
FIG. 11 is a perspective view from below of the lower pivot plate illustrated in FIG. 10.

Referring now to FIGS. 10 and 11, the lower pivot plate 54 is a somewhat irregularly-shaped body having a generally plate-like flange portion 134 surrounding a pedestal portion 136. The flange portion 134 comprises an obverse side 130 and a reverse side 132, and is adapted with a configuration for receipt within a recess 58 in the cantilever arm 32, as illustrated in FIG. 3. The flange portion 134 is provided with a plurality of mounting apertures 140 extending therethrough for receipt of suitable fasteners, such as bolts or screws, extending through the apertures 128 into the cooperative apertures 62 in the recess 58 to attach the lower pivot plate 54 to the base assembly 14.

The pedestal portion 136 is a generally circular body extending orthogonally upwardly from the obverse side 130, defining an opening 138 extending coaxially therethrough, and having a diameter that is generally equal to the diameter of the opening 74 in the upper actuator plate 4 and the opening 96 in the detent plate 50. The pedestal portion 136 comprises a series of alternating recess portions 142 and lug portions 144 corresponding generally with the sector portions 98 and detent portions 100 of the detent plate 50, and the lower recesses 84 of the upper actuator plate 48. Each lug portion 144 terminates radially outwardly in a receptacle 146 adapted for receipt of a finger 102 therein for coupling the detent plate 50 with the lower pivot plate 54, thereby impeding the rotation of the detent plate 50 relative to the lower pivot plate 54. A plurality of bosses 148 extends away from the obverse side 130 of the flange portion 134 radially outwardly of the recess portions 142. The bosses 148 are illustrated as lying along the radial centerline of the recess portions 142 adjoining the circumferential edge of the recess portions 142.

The diameter of the pedestal portion 136 is somewhat less than the diameter of the opening 119 in the lower housing element 52 to enable the pedestal portion 136 to be slidably received within the opening 119.

Preferably, the lug portions 144 are regularly spaced around the pedestal portion 136, extending upwardly from the obverse side 130 of the flange portion 134, in a number equal to the number of detent portions 100 of the detent plate 50, or the lower recesses 84 of the upper actuator plate 48. The bosses 148 are illustrated as regularly spaced at 120° about the circumference of the pedestal portion 136.

Referring again to FIG. 3, the pivot post 60 is a generally elongated, annular body comprising an annular wall 150 terminating at one end in an outwardly-disposed flange 152 circumferentially surrounding the annular wall 150. The diameter of the annular wall 150 is adapted for slidable receipt through the opening 138 of the lower pivot plate 154, the opening 96 of the detent plate 50, and the opening 74 of the upper actuator plate 48.

With reference to FIG. 3, the pivot drive assembly 40 is assembled as follows. The pivot post 60 is first inserted through the opening 138 in the lower pivot plate 54, with the flange 152 bearing against the underside of the lower pivot plate 54. The lower pivot plate 54 is then fixedly attached to the cantilever arm 32 in the recess 58 by fasteners as hereinbefore described. As assembled, the lower pivot plate 54 is immovably attached to the cantilever arm 32, and the pivot post 62 is secured to the cantilever arm 32 by the lower pivot plate 54.

The pivot assembly 30 is assembled by inserting the collar 72 of the upper actuator plate 48 into the ring gear (not shown) in the upper housing 42 to couple the upper actuator plate 48 with the transmission assembly 46. A suitable stop, such as a spring-biased stop pin (not shown) extending from the underside of the upper housing 42, engages one of the upper inclined channelways 86 when the upper actuator plate 48 is installed to the upper housing 42.

The detent plate 50 is installed against the reverse side 82 of the upper actuator plate 48 so that the detent portions 100 are received within the lower recesses 84. The lower housing element 52 is then installed over the upper actuator plate 48 and the detent plate 50 to the underside of the upper housing 42 to secure the upper actuator plate 48 and the detent plate 50 to the upper housing 42 as an integrated assembly. The assembly is then slidably inserted over the pivot post 60 so that the detent plate 50 is coupled with the lower pivot plate 54 by receipt of the fingers 102 in the receptacles 146. A spring, not shown, is inserted over the upper housing 42. A suitable fastener, such as a palnut or friction nut can be installed over the annular wall 150 against the spring to secure the assembly to the pivot post 60 and maintain compression of the spring.

The assembled pivot assembly 30 is then attached to the support frame 22. Preferably, a suitable receptacle (not shown) is provided in the proximal end 36 of the support frame 22 for receipt of the pivot assembly 30 therein. The pivot assembly 30 can also be coupled to the support frame 22 by suitable fasteners, such as bolts or screws, inserted through suitable apertures in the housing 42 into the underside of the support frame 22. Thus, rotation of the pivot drive assembly 40 around the pivot post 60 will rotate the support frame 22 around the pivot post 60.

The powered operation of the pivot assembly 30 in selectively folding and unfolding the reflective element assembly 12 is not compromised by manually folding or unfolding the reflective element assembly 12, regardless of the position from which the reflective element assembly 12 is to be moved, or the manner in which the reflective element assembly 12 was placed in that position. FIGS. 12-15D illustrate the configuration of the elements of the pivot assembly 30 for three pivot scenarios. These scenarios include 1) the configuration after motorized movement of the pivot assembly 30 to locate the reflective element assembly 12 in the fully unfolded position, also referred to as the "home" configuration, 2) the configuration after motorized movement of the reflective element assembly 12 to the fully folded position, or 3) the configuration after manual movement of the reflective element assembly 12 from the folded to the unfolded (home) position.

Figure 12:
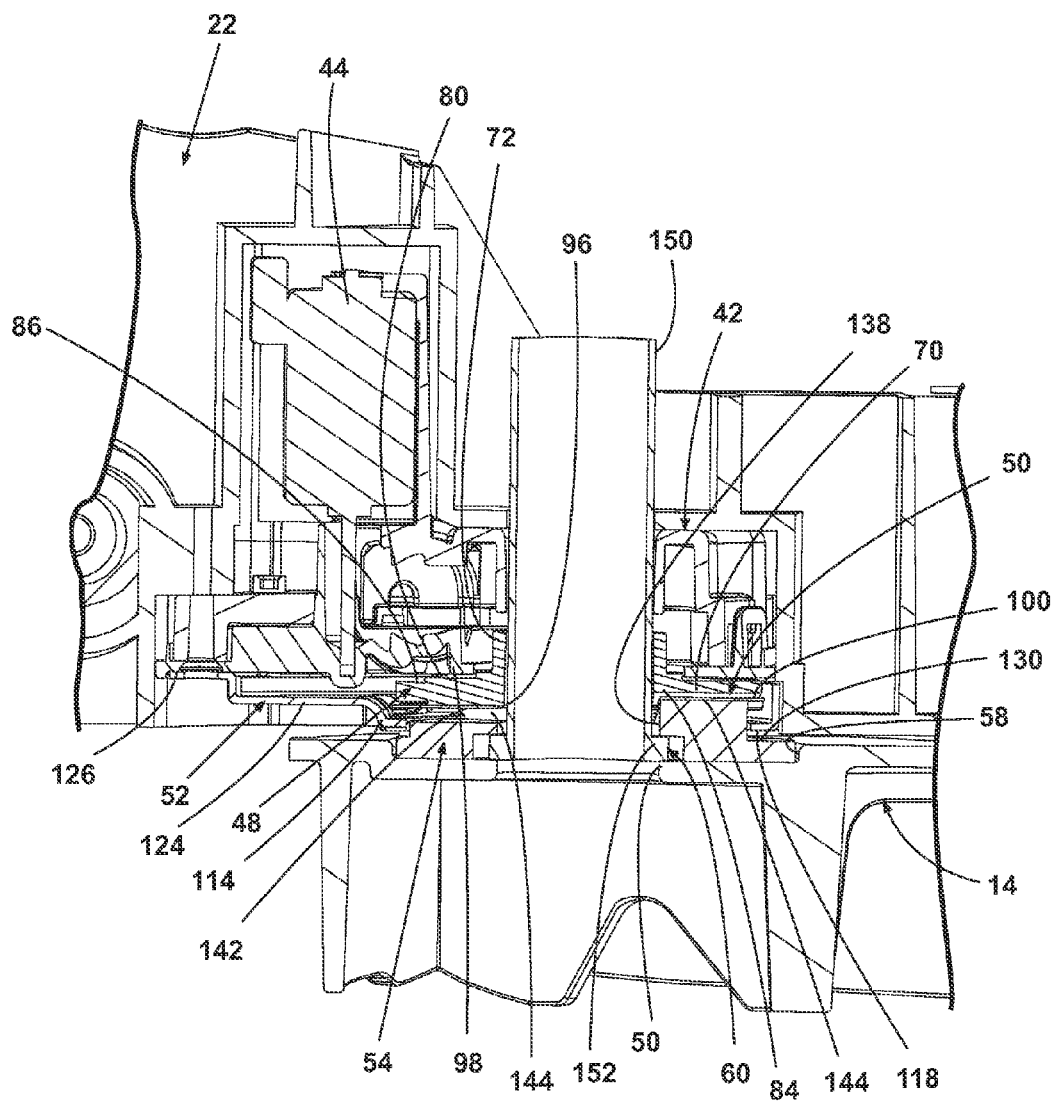
FIG. 12 is a sectional view of the pivot connection illustrating the rearview mirror system in an unfolded configuration, taken along view line 12-12 of FIG. 1.
Figure 12A:
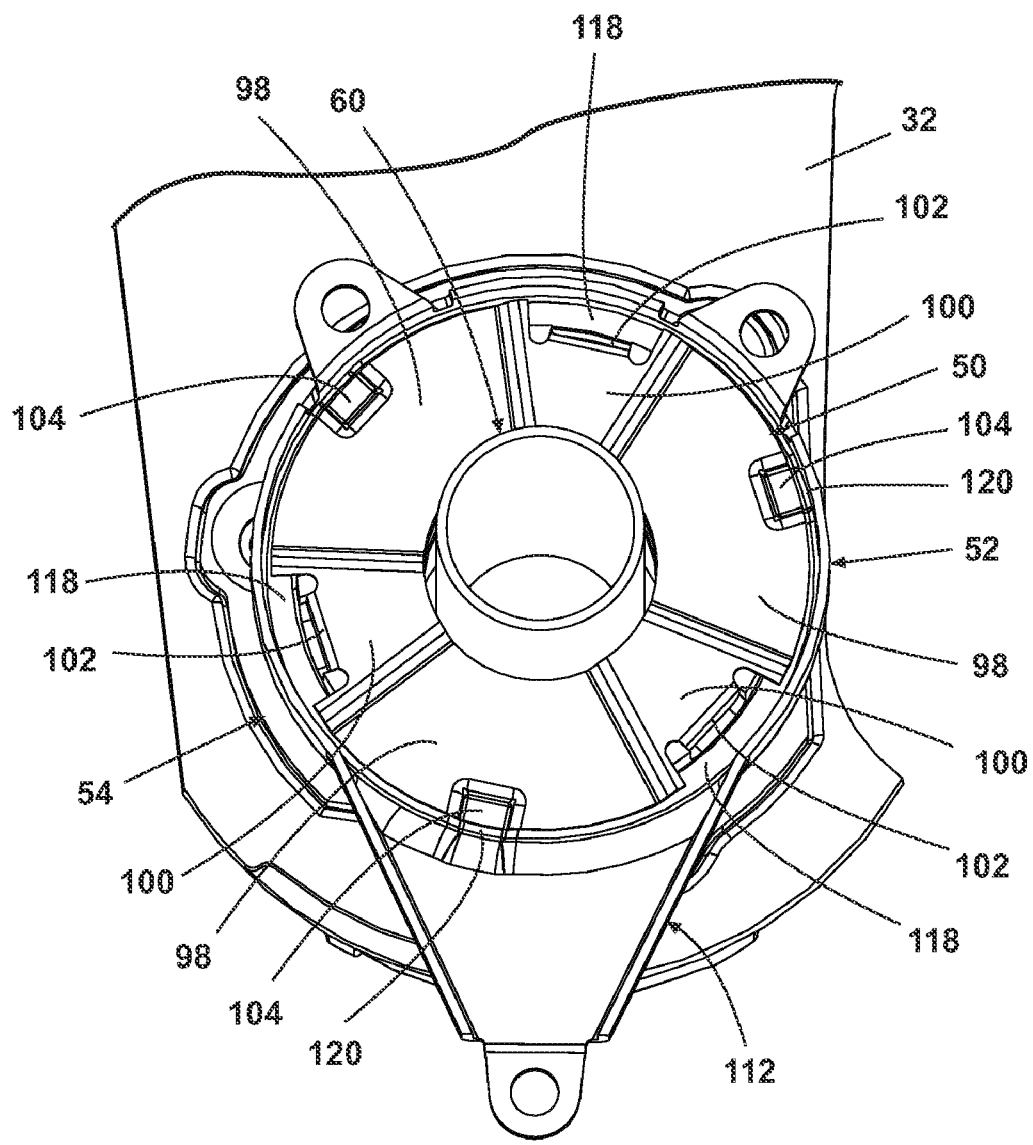
FIG. 12A is a first perspective view from above of the pivot connection illustrated in FIG. 12 with portions removed for clarity.
Figure 12B:
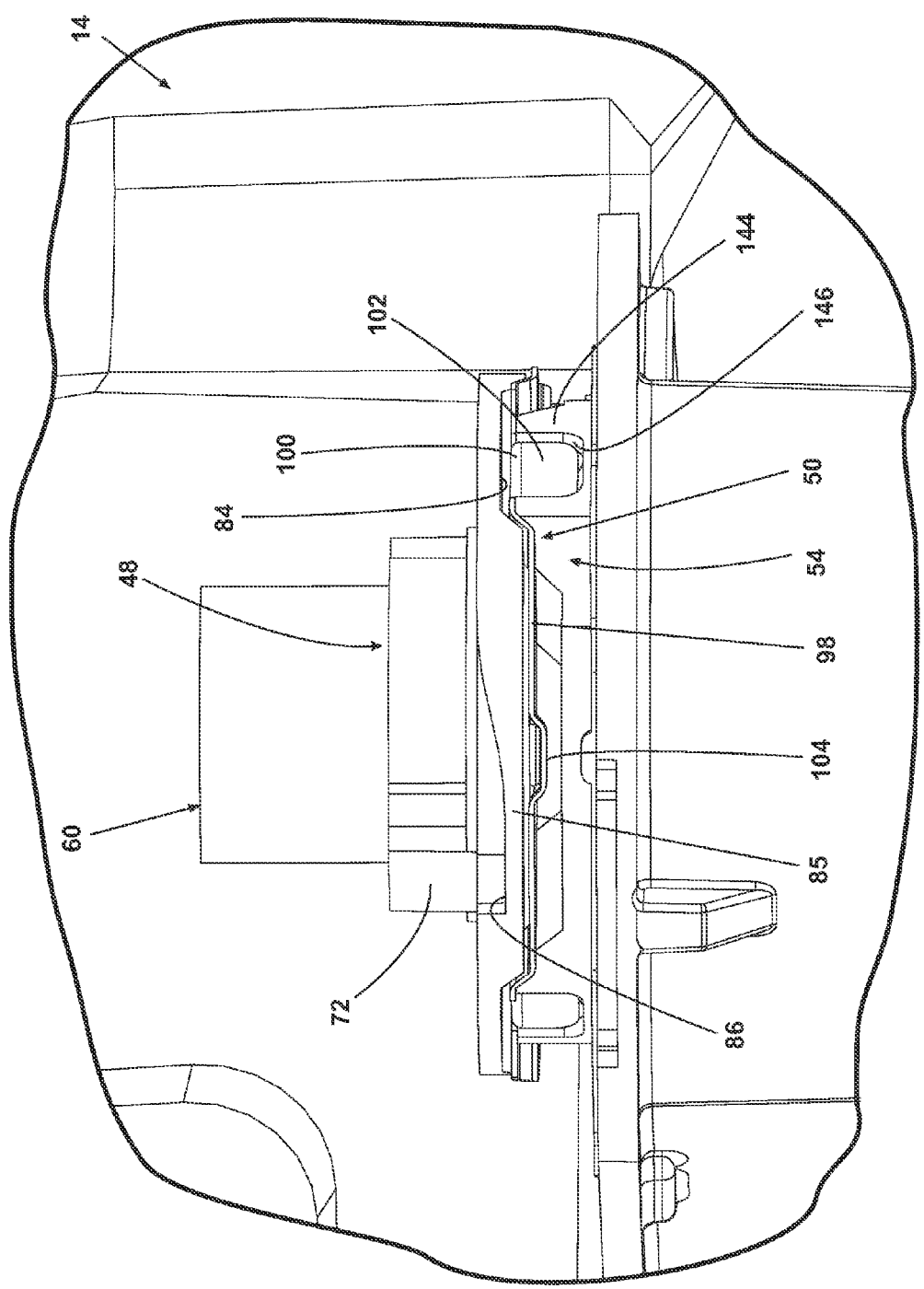
FIG. 12B is a first elevational view of the pivot connection illustrated in FIG. 12A, with portions removed for clarity.
Figure 12C:
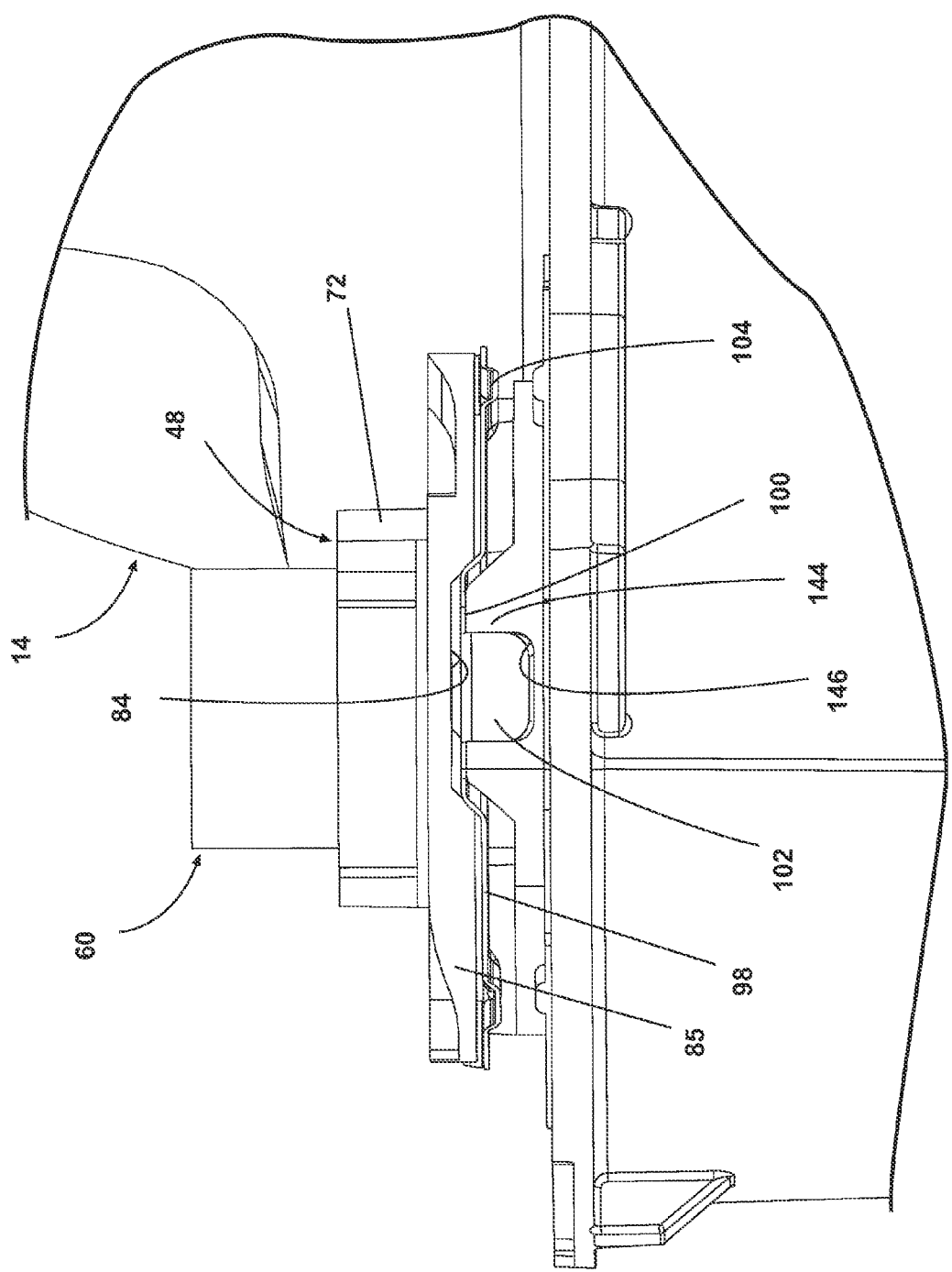
FIG. 12C is a second elevational view of the pivot connection illustrated in FIG. 12A, with portions removed for clarity.
Figure 12D:
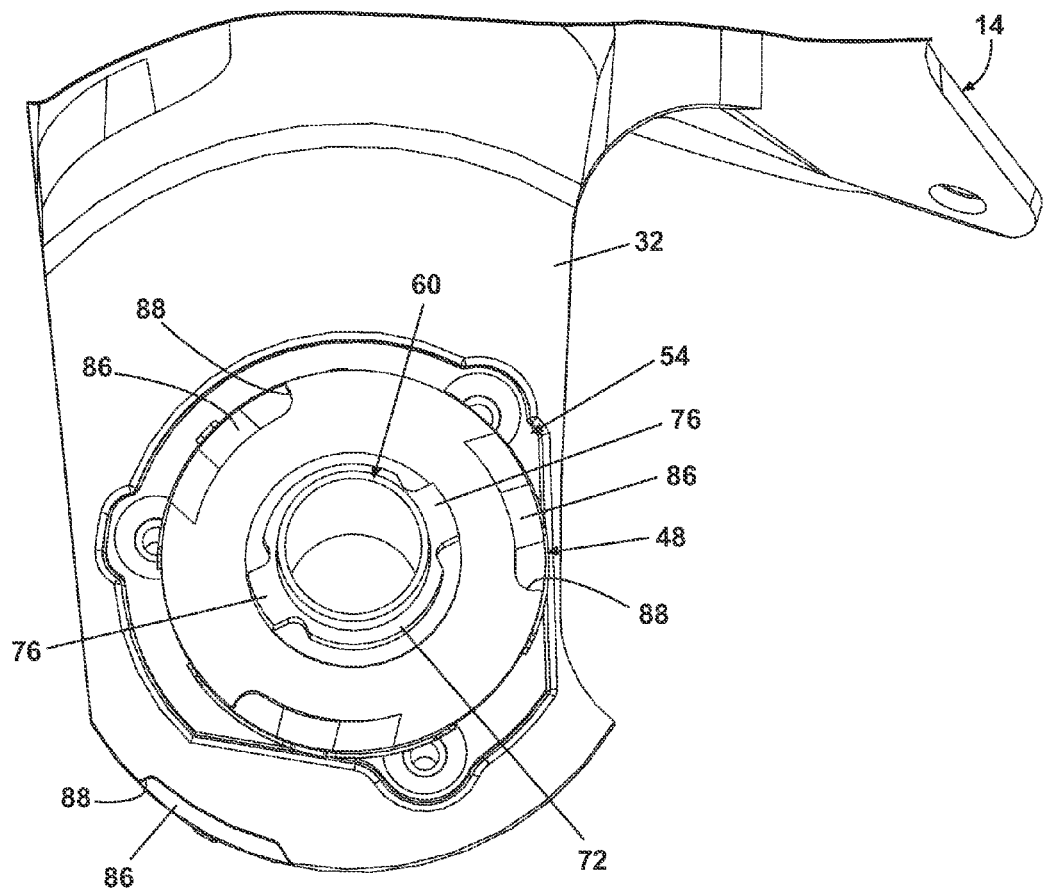
FIG. 12D is a second perspective view from above of the pivot connection illustrated in FIG. 12 with portions removed for clarity.

In the first scenario, illustrated in FIGS. 12-12D, actuation of the motor 44 will cause the pivot drive assembly 40 to rotate around the upper actuator plate 48 until the reflective element assembly 12 is in the fully unfolded position, represented by FIGS. 12 and 12A. As illustrated in FIGS. 12B and C, the upper actuator plate 48 will be retained in a stationary position relative to the lower pivot plate 54 and base 14 by the cooperative engagement of the upper actuator plate 48, the detent plate 50, and the lower pivot plate 54 through the alignment of the lower recesses 84, detent portions 100, and lug portions 144. Effectively, the upper actuator plate 48 will be held in a fixed position relative to the base 14 so that the pivot drive assembly 40 can freely rotate about the upper actuator plate 48. This configuration is shown in FIG. 12D.

Referring again to FIG. 12A, as the upper housing 42 rotates about the upper actuator plate 48, for example during motorized unfolding of the reflective element assembly 12, the lower housing element 52, which is attached to the upper housing 42, will also rotate relative to the lower pivot plate 54 and the detent plate 50. The annular flange 118 of the lower housing element 52 will be supported on the bosses 148 for slidable rotation of the lower housing element 52 relative to the lower pivot plate 54. At the same time, the detents 104 will be urged out of alignment with the detent portions 120. The detents 104 will not engage the detent portions 120 during normal motorized operation. However, the detents 104 and the detent portions 120 will engage when the effective height of the lower housing element 52 is increased due to the disengagement of the lower recesses 84 of the upper actuator plate 48 from the detent portions 100 of the detent plate 50 when the reflective element assembly 12 is manually unfolded to the home position.

Figure 13:
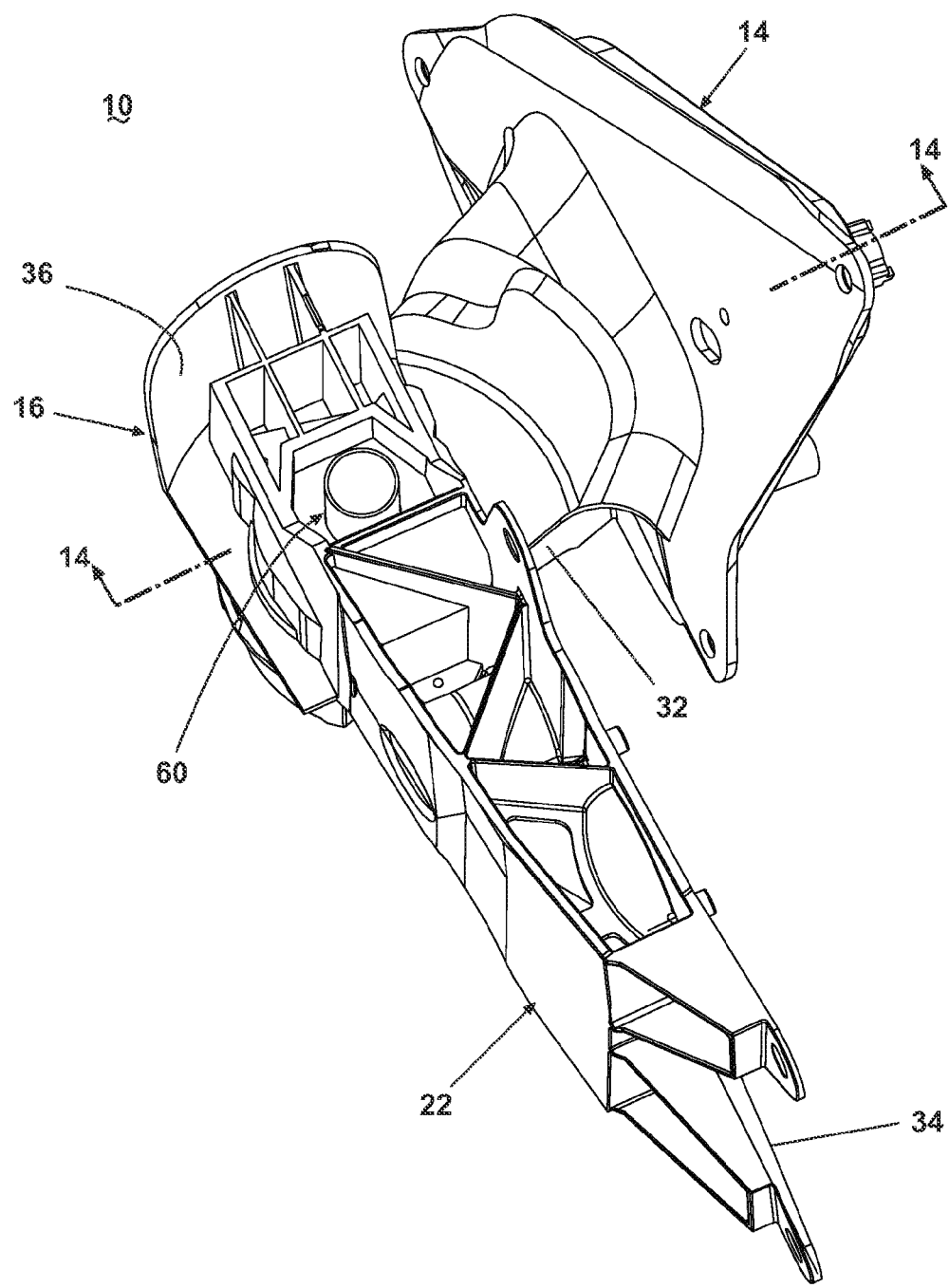
FIG. 13 is a perspective view from above of the base assembly, the powerfold assembly and the support frame illustrated in FIG. 3, showing the rearview mirror system in a folded configuration.
Figure 14:
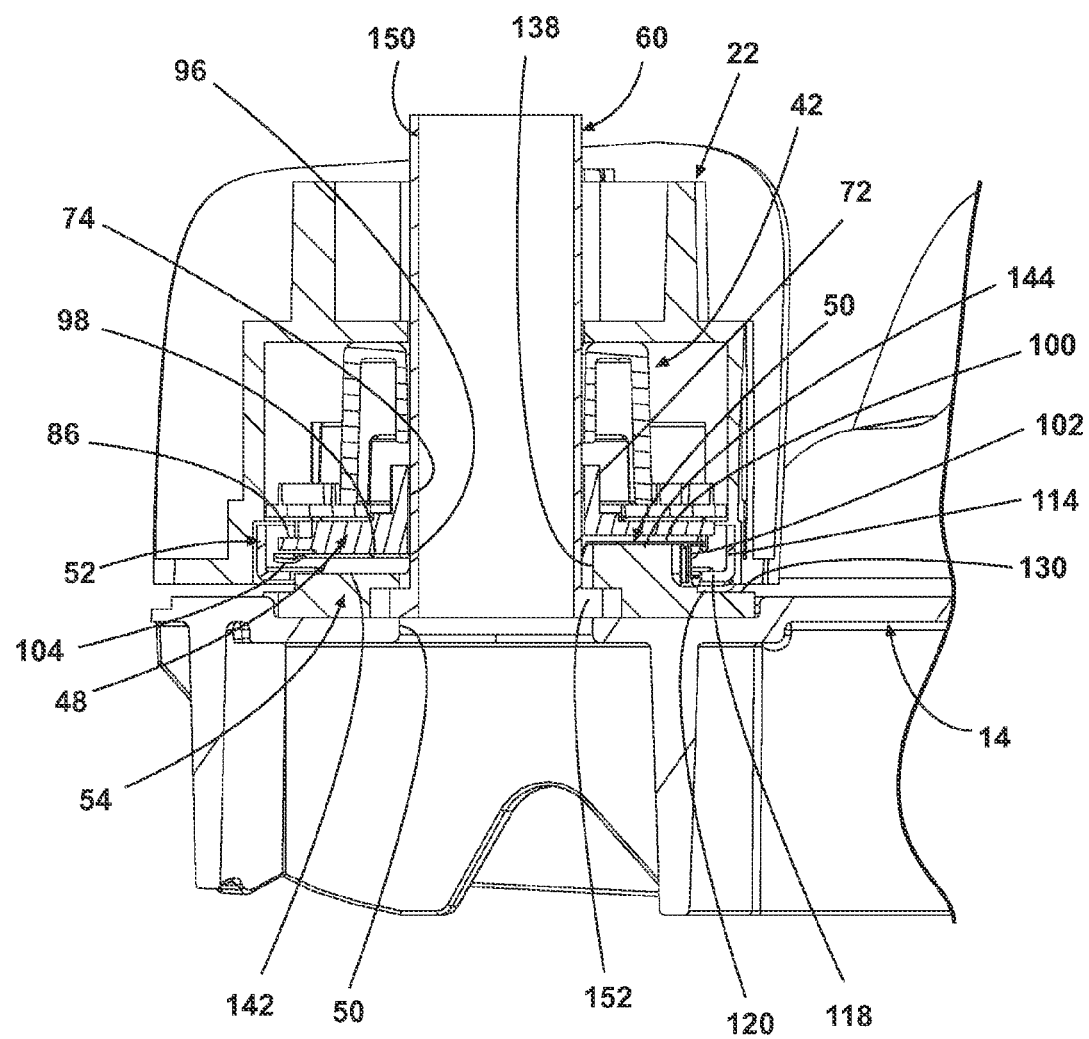
FIG. 14 is a sectional view of the pivot connection illustrated in FIG. 13 taken along view line 14-14.
Figure 14A:
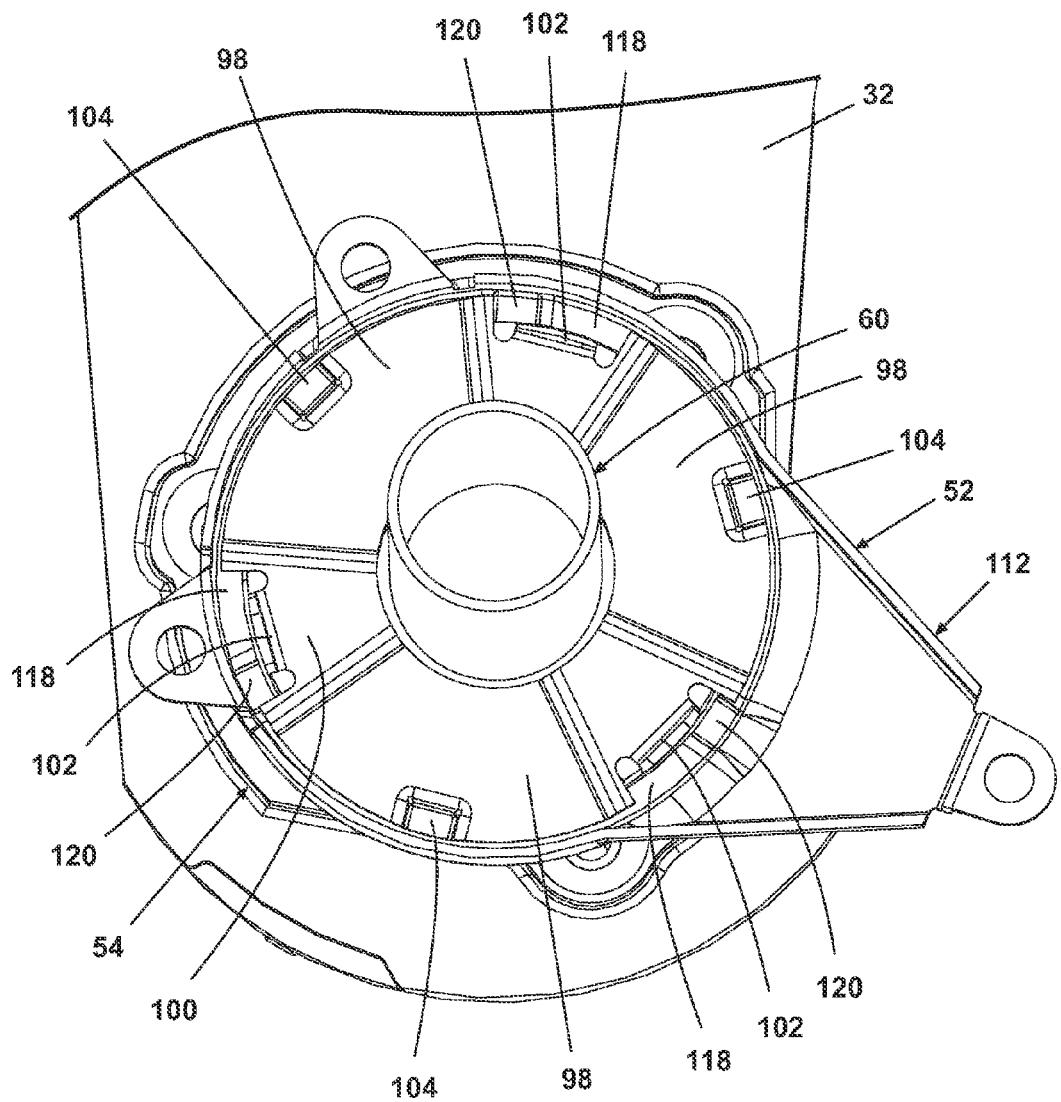
FIG. 14A is a first perspective view from above of the pivot connection illustrated in FIG. 14 with portions removed for clarity.
Figure 14B:
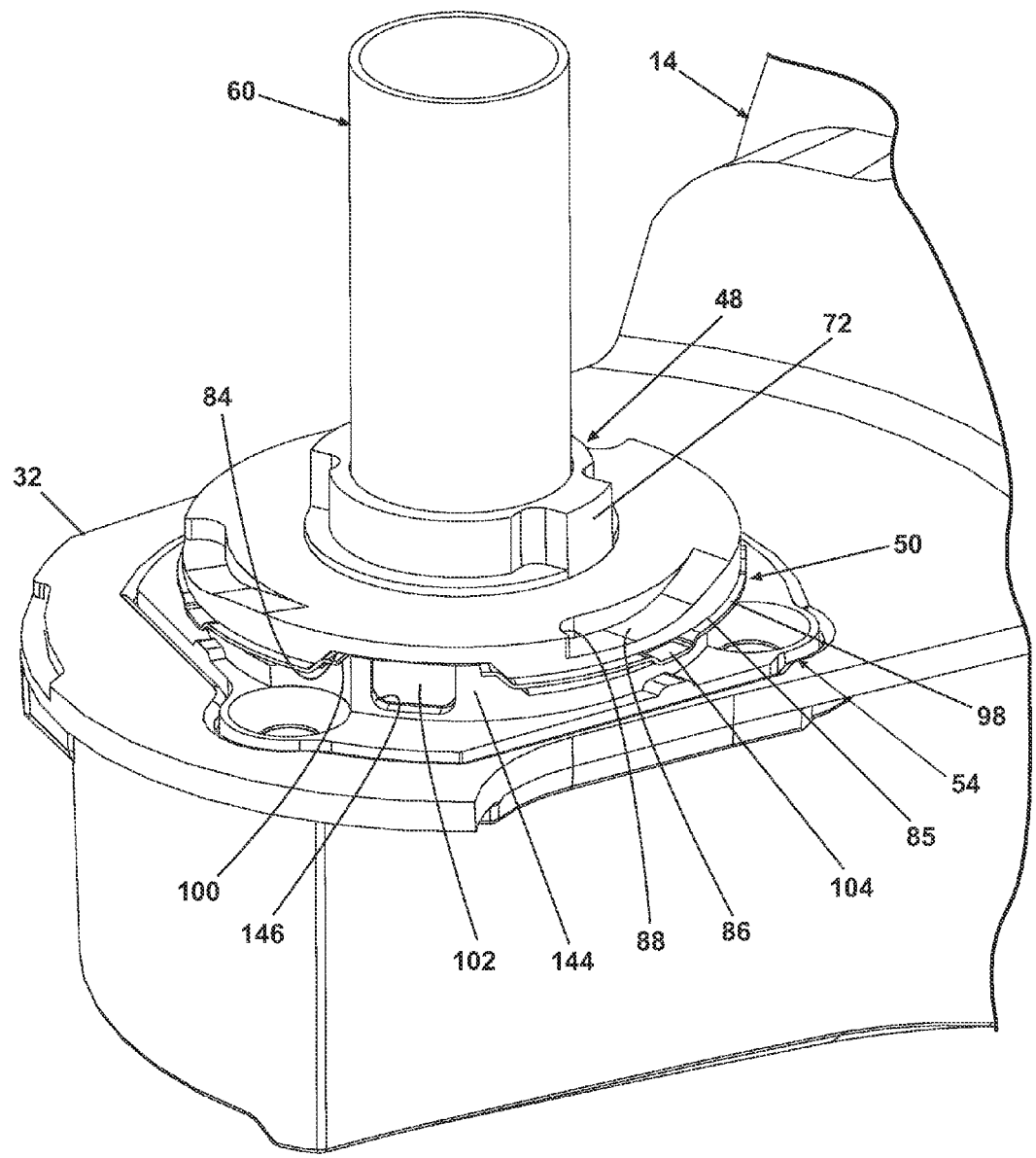
FIG. 14B is a first elevational view of the pivot connection illustrated in FIG. 14A, with portions removed for clarity.
Figure 14C:
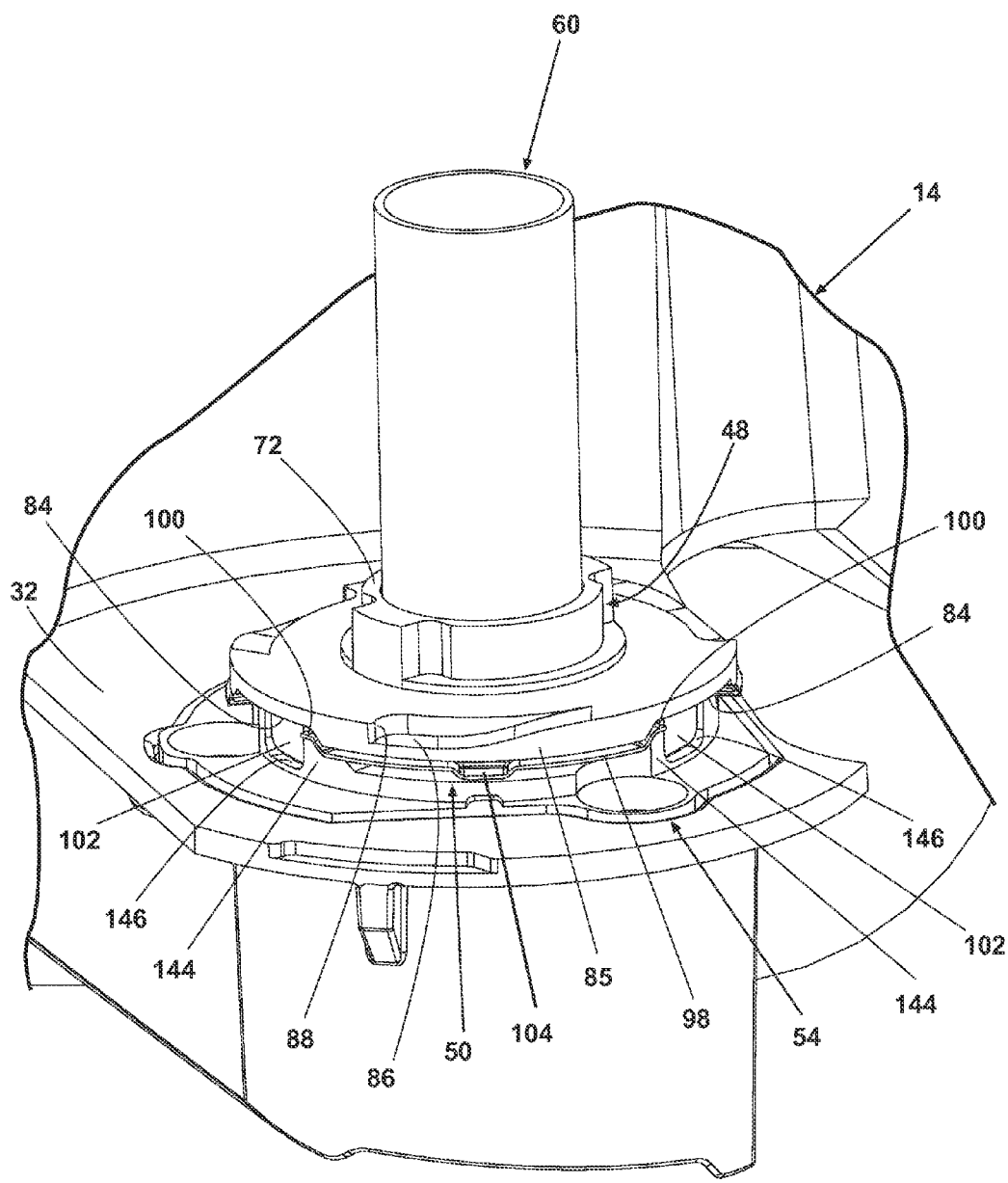
FIG. 14C is a second elevational view of the pivot connection illustrated in FIG. 14A, with portions removed for clarity.
Figure 14D:
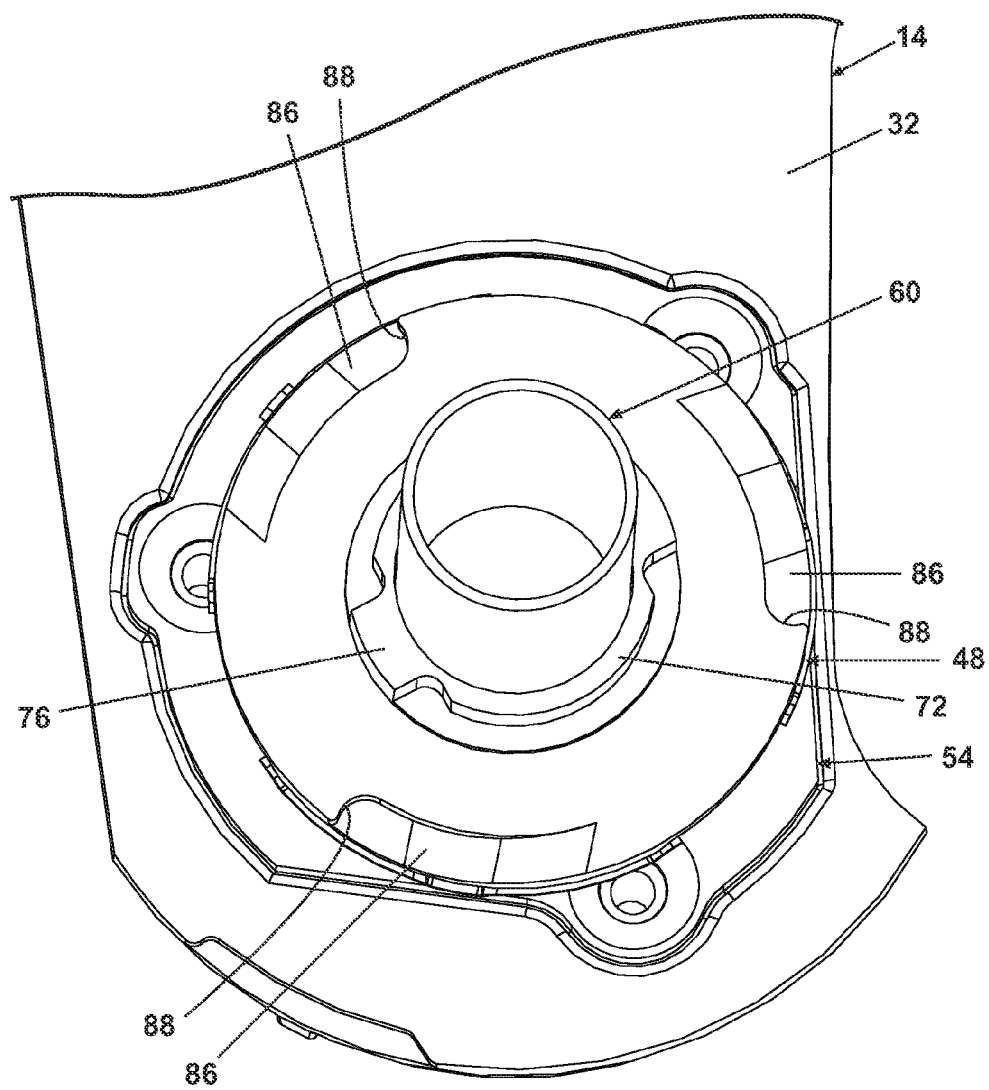
FIG. 14D is a second perspective view from above of the pivot connection illustrated in FIG. 14 with portions removed for clarity.

In the second scenario, the reflective element assembly 12 is folded against the vehicle by actuation of the motor 44, illustrated in FIGS. 13 and 14. In this case, the pivot drive assembly 40 rotates around the stationary upper actuator plate 48 until the reflective element assembly 12 is in the fully folded position, represented by FIG. 14A. As illustrated in FIGS. 14B and C, the upper actuator plate 48 will be retained in a stationary position relative to the lower pivot plate 54 and base 14 by the cooperative engagement of the upper actuator plate 48, the detent plate 50, and the lower pivot plate 54 through the alignment of the lower recesses 84, the detent portions 100, and the lug portions 144. Effectively, the upper actuator plate 48 will be held in a fixed position relative to the base 14 so that the pivot drive assembly 40 can freely rotate about the upper actuator plate 48. This configuration is shown in FIG. 14D, in which it can be seen that the position of the upper actuator plate 48 is identical to its position in the first scenario, illustrated in FIG. 12D.

Referring again to FIG. 14A, as the upper housing 42 rotates about the upper actuator plate 48, the lower housing element 52 will also rotate relative to the lower pivot plate 54 and the detent plate 50. The detents 104 will be urged out of alignment with the detent portions 120. The detents 104 may align with the detents 120, but do not engage the detents 120 unless the lower pivot plate 54 is lifted due to manual folding of the reflective element assembly 12. In remaining otherwise disengaged, excessive load on the actuator motor 44 is prevented during normal motorized powerfold operation.

The movement of the lower housing element 52 relative to the lower pivot plate 54 and the detent plate 50 will be reversed when the reflective element assembly 12 is again unfolded to the "home" position by actuation of the pivot drive assembly 40, and the detents 104 will be urged back into alignment with the detent portions 120.

Figure 15:
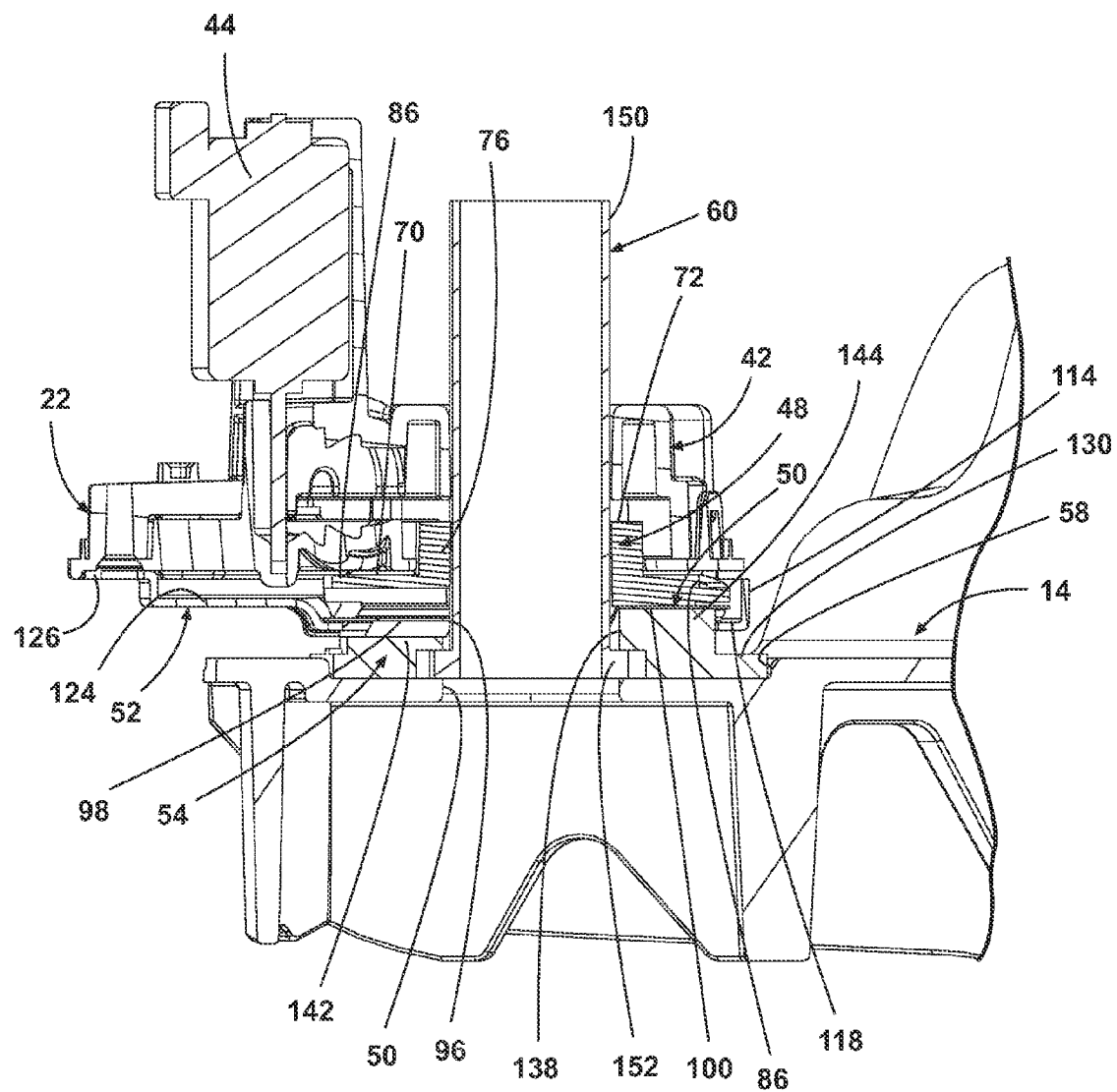
FIG. 15 is a sectional view of the pivot connection illustrating the rearview mirror system in a manually unfolded configuration, taken along view line 12-12 of FIG. 1.
Figure 15A:
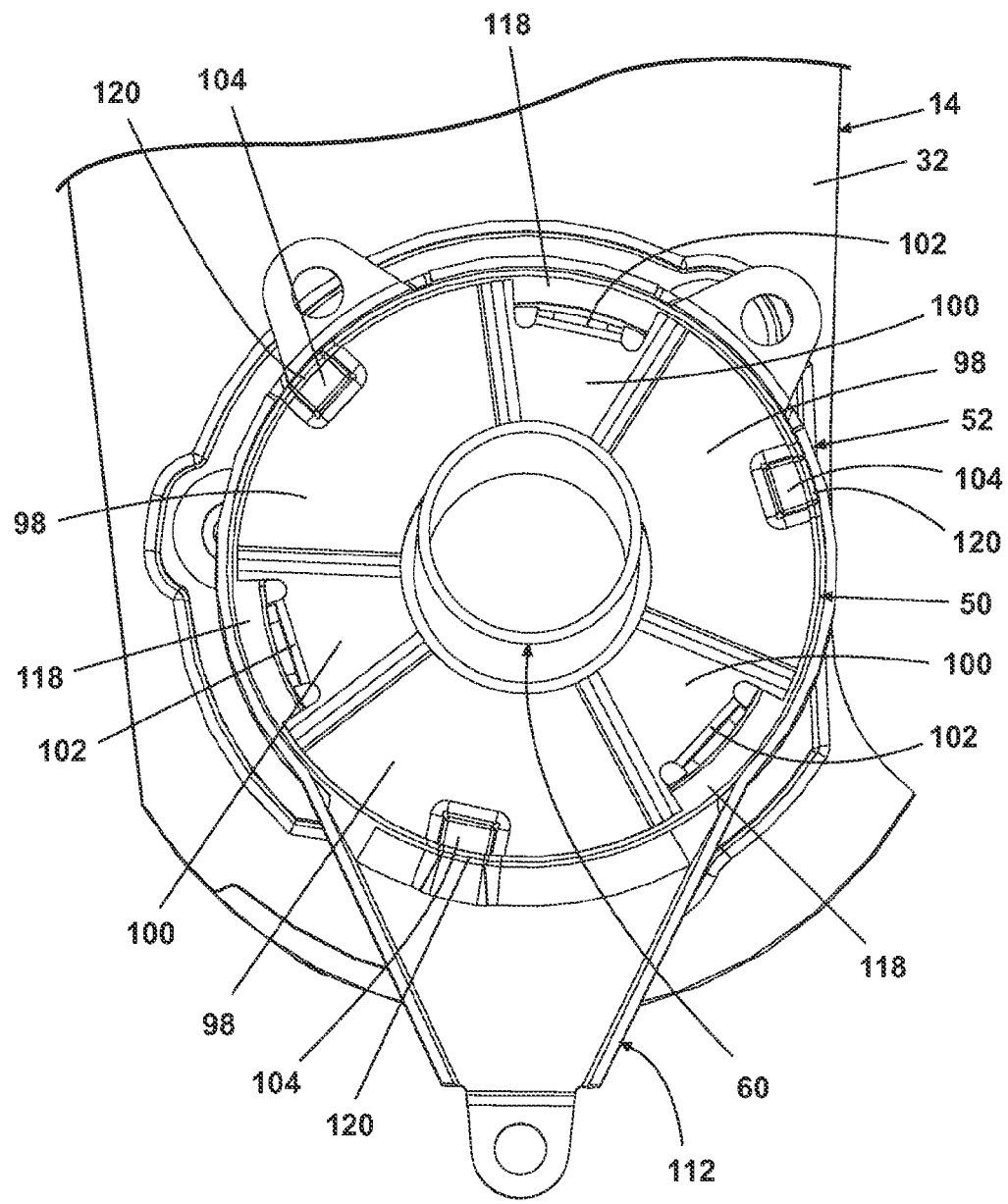
FIG. 15A is a first perspective view from above of the pivot connection illustrated in FIG. 15 with portions removed for clarity.
Figure 15B:
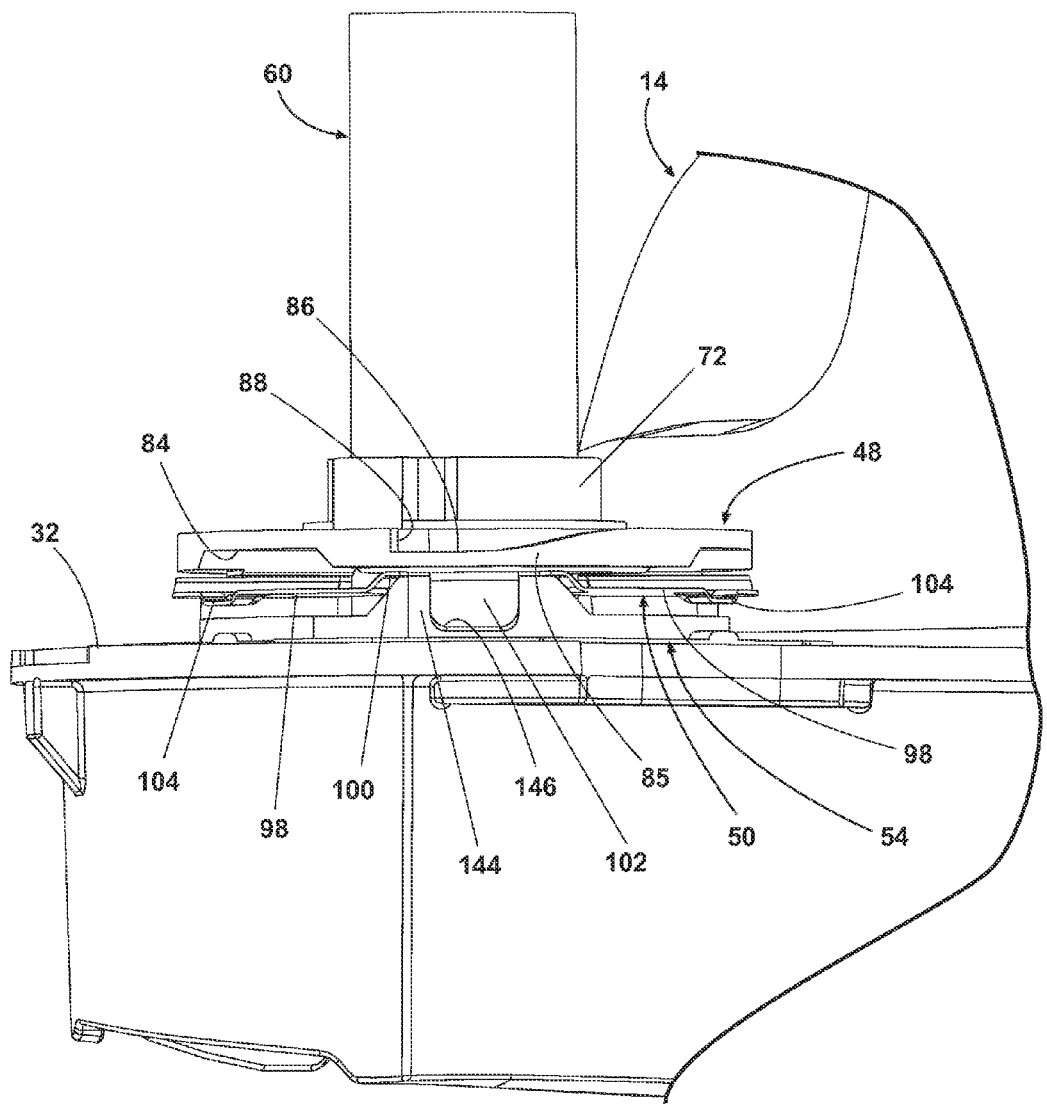
FIG. 15B is a first elevational view of the pivot connection illustrated in FIG. 15A, with portions removed for clarity.
Figure 15C:
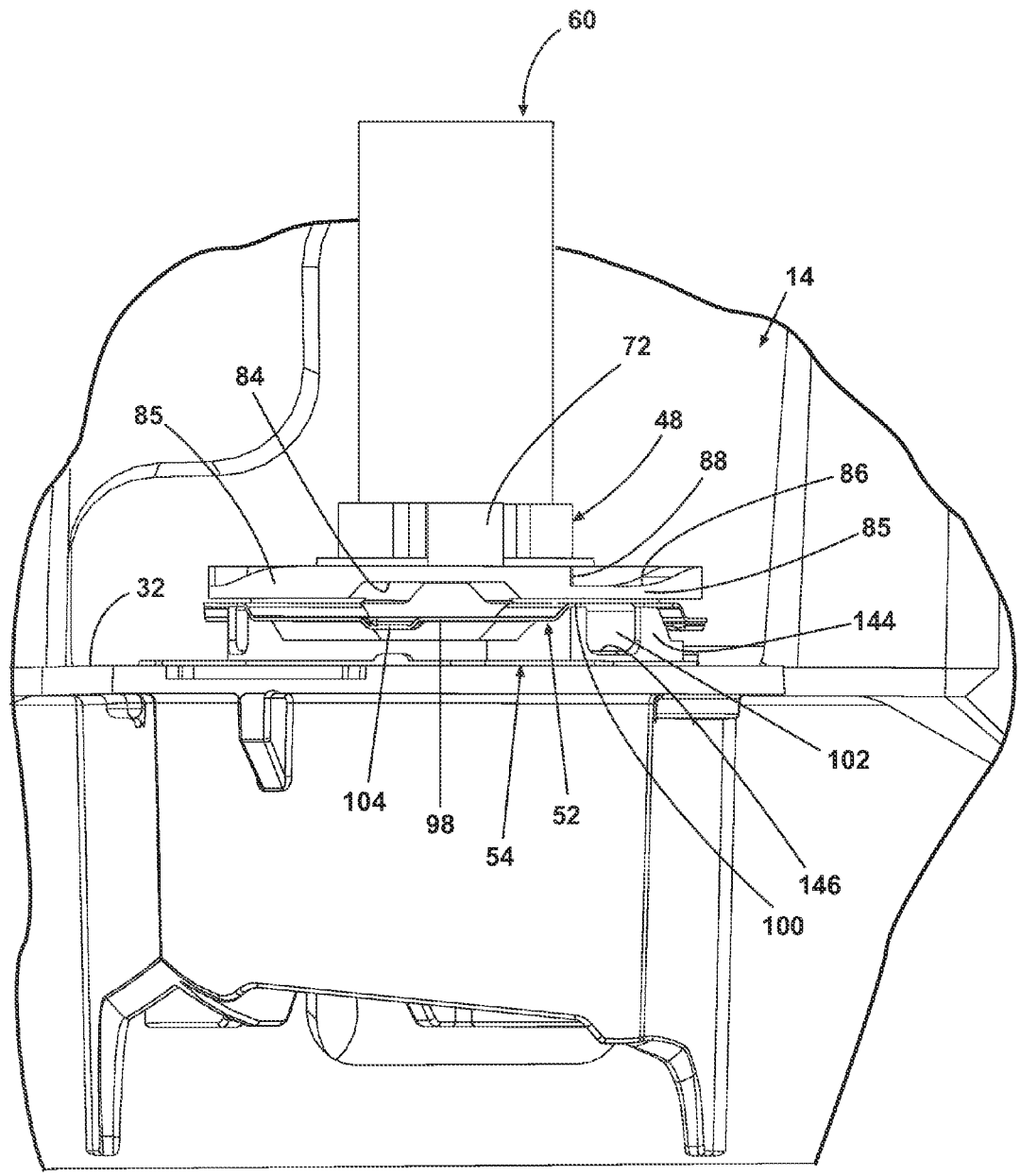
FIG. 15C is a second elevational view of the pivot connection illustrated in FIG. 15A, with portions removed for clarity.
Figure 15D:
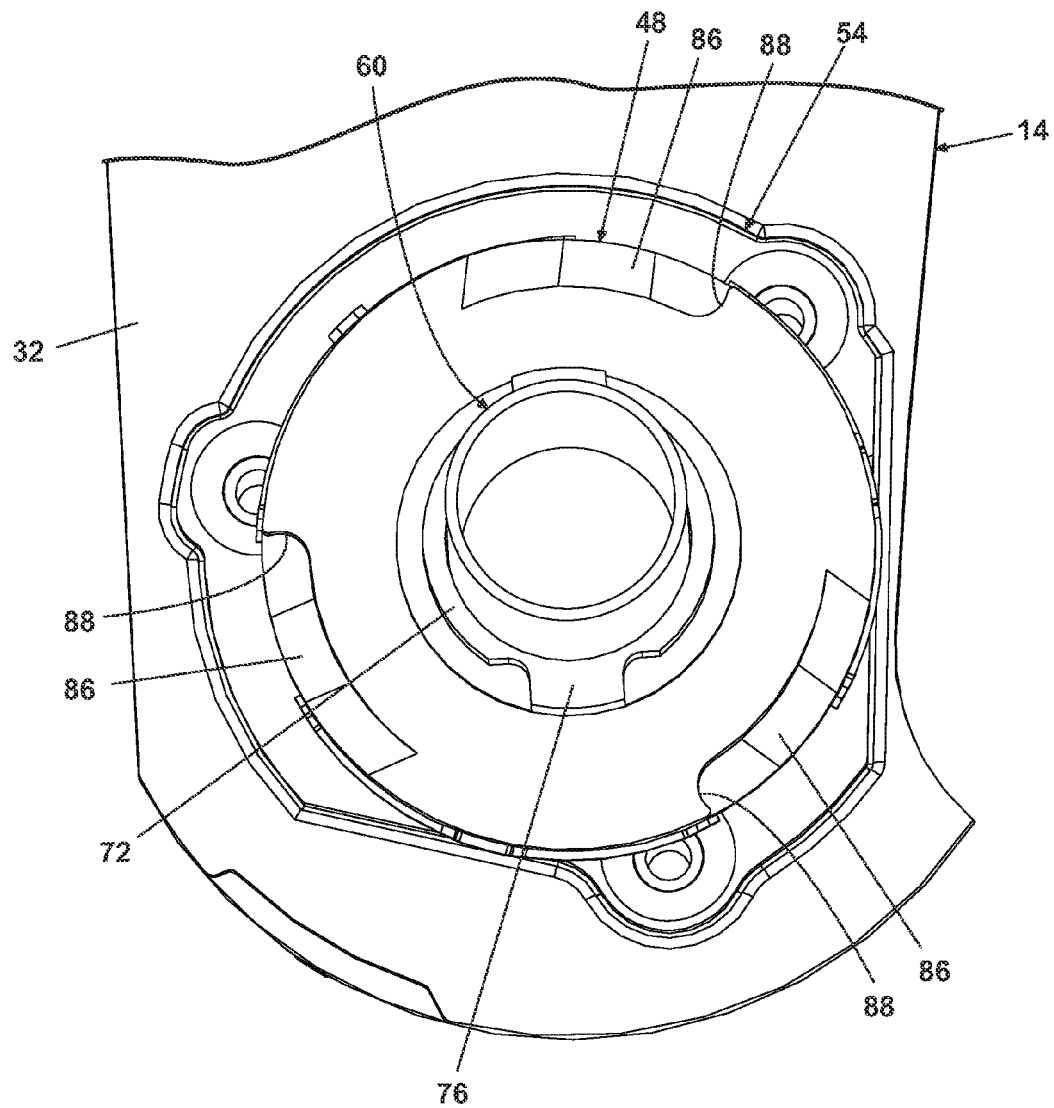
FIG. 15D is a second perspective view from above of the pivot connection illustrated in FIG. 15 with portions removed for clarity.

In the third scenario, illustrated in FIGS. 15-15D, the reflective element assembly 12 is manually unfolded from its configuration in scenario 2. This is illustrated in FIGS. 15 and 15A. In this case, rotation of the support frame 22 and the pivot drive assembly 40 will urge the rotation of the upper actuator plate 48 due to the coupling of the upper actuator plate 48 to the pivot drive assembly 40 through the ring gear and transmission 46, and to the engagement of the stop pin (not shown) extending downward from the upper housing 42 with an end wall 88. At the same time, the lower housing element 52 will be moved relative to the lower pivot plate 54 and the detent plate 50, so that the detent portions 120 reset themselves in the detents 104 (since the detent plate 50 does not rotate, manual rotation of the lower housing element 52 to the fully unfolded position will allow the detent portions 120 to reengage the detents 104), as illustrated in FIG. 15A.

As illustrated in FIGS. 15B and C, the upper actuator plate 48 will rotate relative to the detent plate 50. The rotation of the upper actuator plate 48 will move the lower recesses 84 of the upper actuator plate 48 out of engagement with the detent portions 100 of the detent plate 50. For this to occur, the upper actuator plate 48 will be raised so that the reverse side 82 of the upper actuator plate 48 rides along the tops of the detent portions 100. This configuration is shown in FIG. 15D, in which it can be seen that the position of the upper actuator plate 48 is rotated relative to its position in the second scenario, illustrated in FIG. 14D. At the same time, the detent portions 120 of the lower housing element 52 will rotate relative to the detents 104 of the detent plate 50. At this point, various combinations of results can occur. The upper actuator plate 48 can either rotate sufficiently to re-seat the lower recesses 84 on the detent portions 100, or the planar portion of the reverse side 82 of the upper actuator plate 48 can remain in contact with the detent portions 100. At the same time, the detent portions 120 can reset themselves in the detents 104, thereby indicating the proper positioning of the reflective element assembly 12, or the detents 104 can remains engaged with the annular flange 118 intermediate the detent portions 120.

Subsequent activation of the motor 44 from the configuration previously described will provide one of two results. The pivot drive assembly 40 will rotate around the upper actuator plate 48 if the friction between the upper actuator plate 48 and the detent plate 50 is sufficient to keep the upper actuator plate 48 from rotating. Alternately, if the friction between the upper actuator plate 48 and the detent plate 50 is inadequate, the pivot drive assembly 40 will cause the upper actuator plate 48 to rotate. This can occur if the engagement of the detents 104 in the detent plate 50 and the detent portions 120 in the lower housing element 52 is sufficient to keep the lower housing element 52 (and the upper housing 42) from rotating relative to the detent plate 50.

If the pivot drive assembly 42 rotates about the upper actuator plate 48, rotation will continue until the stop pin in the upper housing 42 contacts the end wall 88 of the upper inclined channelway 86 of the upper actuator plate 48, or the support frame 20 reaches a pivot stop, thereby preventing further rotation of the support frame 22 relative to the base 14. In either case, continued actuation of the motor 44 will initiate the rotation of the upper actuator plate 48 until the actuator plate 48 has rotated sufficiently to re-engage the lower recesses 84 with the detent portions 100.

Alternatively, if the friction between the detent plate 50 and the lower housing element 52 is sufficient, the motor 44 will rotate the upper actuator plate 48 until the lower recesses 84 reengage the detent portions 100, and the pivot drive assembly 40 and support frame 22 will begin rotating about the upper actuator plate 48 as previously described.

The dual detent powerfold assembly described herein solves the problem of providing a positive positioning of the mirror reflective element when folded to the home position manually, in which case the detent contact between the detents 104 and the detent portions 120 serve the purpose normally served by the detent portions 100 and the lower recesses 84 under normal operation. The purpose of the secondary detent is to provide a detent locking mechanism for the home position in the event that the reflective element assembly is moved manually to the home position, which may result in disengagement of the primary detent system. However, motorized actuation after manually folding the reflective element assembly is possible independently of the secondary detent. The secondary detent system remains disengaged at all times during normal motorized operation, even though the detents 104 and the detent portions 120 come into alignment in the home position. This prevents excessive load on the motor, thereby reducing the risk of premature motor failure. The secondary detents engage only when the lower housing plate 52 raises up due to disengagement of the primary detents during manual folding of the reflective element assembly.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mirror assembly for use on a motor vehicle comprising:
    a reflective element assembly for providing a rearward reflective view to an operator of a motor vehicle;
    a base adapted to be mounted to a motor vehicle;
    a powered drive assembly for moving said reflective element assembly between a folded configuration and an unfolded configuration;
    a support arm assembly for supporting said reflective element assembly, and attachable to said base for movement between said folded configuration and said unfolded configuration;
    a detent assembly interposed between said support arm assembly and said base; and
    a pivot assembly associated with said detent assembly for manual and motorized movement of said support arm assembly between said folded configuration and said unfolded configuration;
    said pivot assembly including:
    an upper housing;
    an annular upper actuator plate in rotational association with said powered drive assembly, characterized by a lower recess in a reverse side of said annular upper actuator plate;
    an annular detent plate characterized by a raised detent portion adjoining an arcuate sector portion, for nested association with said lower recess, including a depending finger associated with said raised detent portion, and a sector detent depending from said sector portion;
    a ring-like lower housing element characterized by an annular flange, including a flange detent portion for nested association with said sector detent; and
    a lower pivot plate characterized by a lower recess portion for nested association with said sector portion, a lug portion for nested association with said raised detent portion and said lower recess, a receptacle for nested association with said finger, and a boss for association with said ring-like lower housing element;
    wherein during motorized movement of said support arm assembly between said folded configuration and said unfolded configuration, said annular upper actuator plate is stationary relative to said base, and said powered drive assembly freely rotates about said annular upper actuator plate; and
    wherein during manual movement of said support arm assembly from said folded configuration to said unfolded configuration, said annular upper actuator plate rotates with rotation of said support arm assembly and said powered drive assembly, and said lower recess, said raised detent portion, and said lug portion are disengaged; and
    wherein during motorized movement of said support arm assembly subsequent to said manual movement, said raised detent portion is reengaged with said lower recess by relative rotation between said annular upper actuator plate and said detent plate, and said powered drive assembly freely rotates about said annular upper actuator plate.

2. A mirror assembly according to claim 1 wherein said annular upper actuator plate, said detent plate, and said lower pivot plate are concentrically disposed.

3. A mirror assembly according to claim 1 wherein said annular upper actuator plate is in an engaged configuration when said reflective element assembly is moved between a folded configuration and an unfolded configuration through operation of said drive assembly.

4. A mirror assembly according to claim 1 wherein said annular upper actuator plate is rotatable relative to said base.

5. A mirror assembly according to claim 1 wherein said annular upper actuator plate is rotatable relative to said base during manual rotation of said reflective element assembly from said folded configuration to said unfolded configuration.

6. A mirror assembly according to claim 5 wherein manual rotation of said reflective element assembly followed by motorized rotation of said reflective element assembly will result in one of rotation of said annular upper actuator plate relative to said base and maintenance of said annular upper actuator plate in a stationary configuration relative to said base.

7. A mirror assembly for use on a motor vehicle comprising:
    a reflective element assembly for providing a rearward reflective view to an operator of a motor vehicle;
    a base adapted to be fixedly mounted to a motor vehicle;
    a support arm assembly having a first end and a second end, said first end being attached to said base for movement between a folded configuration and an unfolded configuration, said second end being mounted to said reflective element assembly;
    a pivot assembly for rotation of said support arm assembly between said folded configuration and said unfolded configuration; and
    a detent assembly interposed between said first end of said support arm assembly and said base;
    said pivot assembly including:
    a pivot drive assembly, including an upper housing, for controlling motorized movement of said support arm assembly;
    an annular upper actuator plate in rotational association with said pivot drive assembly, characterized by a lower recess in a reverse side of said annular upper actuator plate;
    an annular detent plate characterized by a raised detent portion adjoining an arcuate sector portion, for nested association with said lower recess, including a depending finger associated with said raised detent portion, and a sector detent depending from said sector portion;
    a ring-like lower housing element characterized by an annular flange, including a flange detent portion for nested association with said sector detent; and a lower pivot plate characterized by a lower recess portion for nested association with said sector portion, a lug portion for nested association with said raised detent portion and said lower recess, a receptacle for nested association with said finger, and a boss for association with said ring-like lower housing element;

wherein during motorized movement of said support arm assembly between said folded configuration and said unfolded configuration, said annular upper actuator plate is stationary relative to said base, and said pivot drive assembly freely rotates about said annular upper actuator plate; and wherein during manual movement of said support arm assembly from said folded configuration to said unfolded configuration, said annular upper actuator plate rotates with rotation of said support arm assembly, said ring-like lower housing element rotates relative to said lower pivot plate and said detent plate, said lower recess, said raised detent portibn, and said lug portion are disengaged, and said annular upper actuator plate is raised relative to said detent plate; and wherein during motorized movement of said support arm assembly subsequent to said manual movement, said raised detent portion is reseated with said lower recess by relative rotation between said annular upper actuator plate and said detent plate, and said pivot drive assembly freely rotates about said annular upper actuator plate.

8. A mirror assembly according to claim 7 wherein said annular upper actuator plate and said detent plate are independently rotatable between an engaged configuration and a disengaged configuration.

9. A mirror assembly according to claim 7 wherein said motorized unfolded configuration of said reflective element assembly is associated with a first detent configuration, and said manually unfolded configuration of said reflective element assembly is associated with a second detent configuration.

10. A mirror assembly according to claim 9 wherein said first detent configuration includes detent contact between said raised detent portion and said lower recess.

11. A mirror assembly according to claim 9 wherein said second detent configuration includes detent contact between said sector detent and said flange detent portion.

12. A mirror assembly according to claim 9 wherein during said motorized movement of said reflective element assembly, said second detent configuration is arrested.

13. A mirror assembly according to claim 12 wherein said second detent configuration arises when said first detent configuration is counteracted by manual folding of said reflective element assembly.

* * * * *